(12) United States Patent
Sandbach et al.

(10) Patent No.: US 6,861,961 B2
(45) Date of Patent: Mar. 1, 2005

(54) FOLDABLE ALPHA NUMERIC KEYBOARD

(75) Inventors: David Lee Sandbach, London (GB); Christopher Chapman, Oxon (GB)

(73) Assignee: Electrotextiles Company Limited, Hertfordshire (GB)

( * ) Notice: Subject to any disclaimer, the term of this patent is extended or adjusted under 35 U.S.C. 154(b) by 467 days.

(21) Appl. No.: 09/980,299

(22) PCT Filed: Mar. 30, 2001

(86) PCT No.: PCT/GB01/01425
§ 371 (c)(1),
(2), (4) Date: Nov. 29, 2001

(87) PCT Pub. No.: WO01/75922
PCT Pub. Date: Oct. 11, 2001

(65) Prior Publication Data
US 2002/0135457 A1 Sep. 26, 2002

(51) Int. Cl.$^7$ .......................... H03K 17/94; H03M 11/00
(52) U.S. Cl. ...................... 341/22; 345/173; 178/18.05; 200/268
(58) Field of Search .................. 341/22, 34; 178/18.05; 345/156, 168, 173, 178; 200/268, 269, 5 A, 262

(56) References Cited

U.S. PATENT DOCUMENTS

| | | |
|---|---|---|
| 3,745,287 A | 7/1973 | Walker |
| 3,911,215 A | 10/1975 | Hurst et al. |
| 4,220,815 A | 9/1980 | Gibson et al. |
| 4,659,873 A | 4/1987 | Gibson et al. |
| 4,687,885 A | 8/1987 | Talmage, Jr. et al. |
| 4,707,845 A | 11/1987 | Krein et al. |
| 4,725,696 A | 2/1988 | Furukawa et al. |
| 4,798,919 A | 1/1989 | Miessler et al. |
| 4,837,548 A * | 6/1989 | Lodini .......................... 338/47 |
| 5,159,159 A | 10/1992 | Asher |
| 5,220,521 A | 6/1993 | Kikinis |
| 5,262,778 A | 11/1993 | Saunders |
| 5,453,941 A | 9/1995 | Yoshikawa |
| 5,686,705 A | 11/1997 | Conroy et al. |
| 5,815,139 A | 9/1998 | Yoshikawa et al. |
| 5,852,260 A | 12/1998 | Yoshikawa |
| 6,180,900 B1 * | 1/2001 | Horiuchi ..................... 200/262 |
| 6,333,736 B1 * | 12/2001 | Sandbach .................... 345/178 |
| 6,714,407 B2 * | 3/2004 | Zheng ........................ 361/683 |
| 2002/0119685 A1 * | 8/2002 | Gardenfors et al. .......... 439/86 |
| 2004/0066366 A1 * | 4/2004 | Jung et al. .................. 345/156 |

FOREIGN PATENT DOCUMENTS

| | | |
|---|---|---|
| DE | 89 01 047 | 4/1989 |
| DE | 295 12 756 | 10/1995 |
| EP | 0 261 770 | 7/1987 |
| EP | 0921544 | 6/1999 |
| EP | 0989509 | 3/2000 |
| GB | 2 350 431 | 4/2000 |
| GB | 2 350 683 | 5/2000 |
| WO | WO 00/72239 A1 | 5/2000 |

OTHER PUBLICATIONS

International Search Report—PCT/GB01/01425; EPO, Jul. 19, 2001.

* cited by examiner

*Primary Examiner*—Timothy Edwards, Jr.
(74) *Attorney, Agent, or Firm*—Harness, Dickey & Pierce, PLC

(57) ABSTRACT

The present invention relates to a foldable alpha numeric keyboard device (2301) configured to input data items into a computer or similar processing device (2307). The keyboard device comprises a first electrically conductive fabric sheet, a second electrically conductive fabric sheet and an interface circuit configured to supply voltages to and receive outputs from said keyboard. In addition; the keyboard is configured to produce an output in response to a mechanical interaction and the interface circuit is arranged to respond to the mechanical interaction and to provide a data item to a computer or similar processing device.

25 Claims, 32 Drawing Sheets

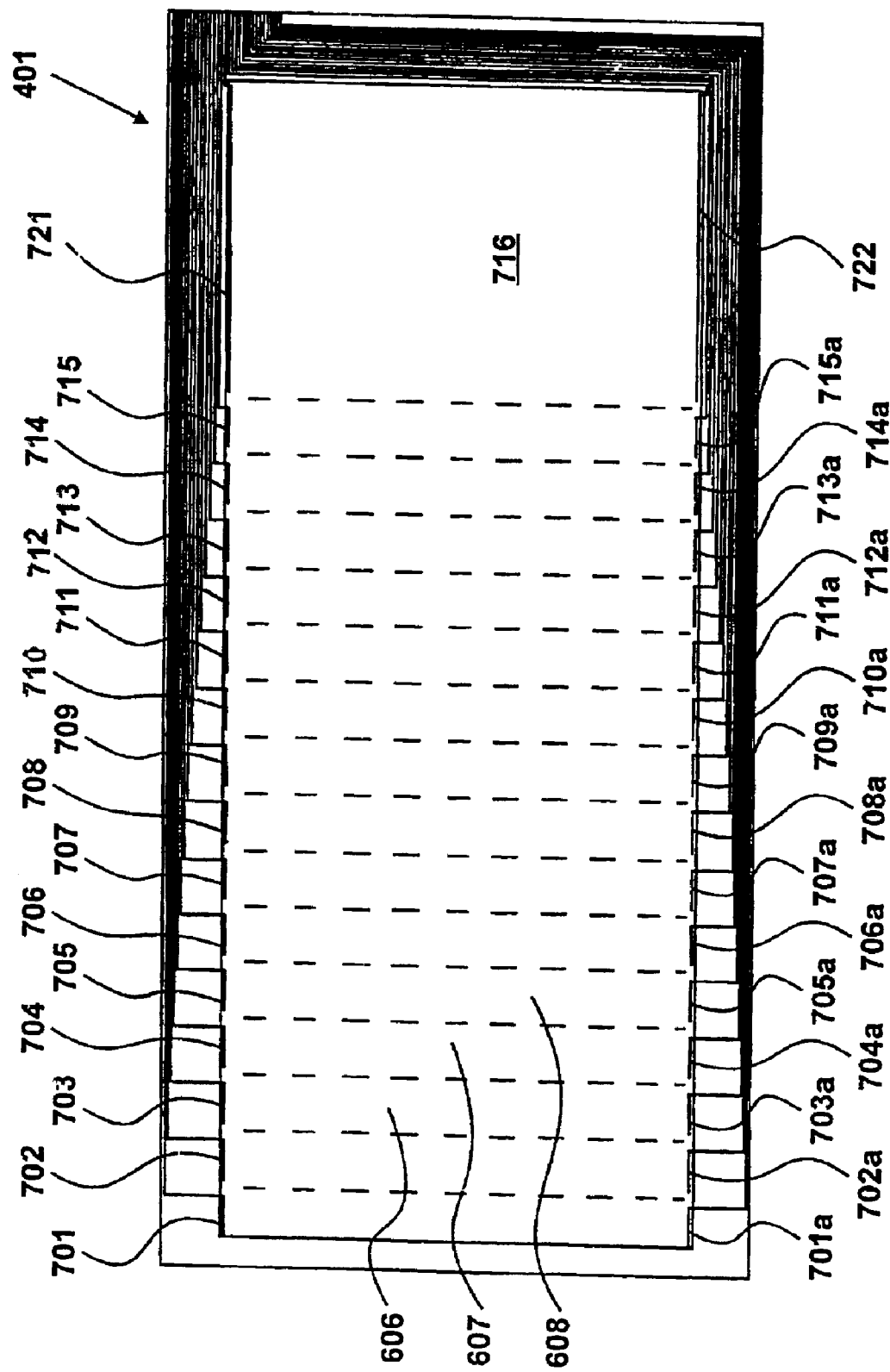

FOLDABLE ALPHA NUMERIC KEYBOARD

The present invention relates to a data input keyboard device for a computer or similar electronic device, particularly where the keyboard device is fabricated from textile fabrics.

Flexible keyboards, particularly in the form of membrane keyboards, are known. Such keyboards comprise one or more sheets of a plastic membrane material such as Mylar-$^{RTM}$ or the like, to which electrical contacts are applied, commonly in the form of printed silver-loaded ink or a similar conductive material. The electrical contacts are specifically configured so as to enable an electrical output to be detected in response to key-presses on the membrane keyboard. Accordingly, the precise position and, hence, the identity of the actual key pressed can be determined.

A problem with known membrane keyboards is the inherent plasticity of the membrane material and the high internal friction that occurs between constituent layers during bending. As a consequence, the durability and flexibility of membrane keyboards is compromised.

According to a first aspect of the present invention there is provided a foldable alpha numeric keyboard device configured to input data items into a computer or similar processing device, said keyboard device comprising a first electrically conductive fabric sheet and a second electrically conductive fabric sheet; an interface circuit configured to supply voltages to and receive outputs from said keyboard; wherein said keyboard is configured to produce an output in response to a mechanical interaction and said interface circuit is arranged to respond to said mechanical interaction and to provide a data item to said computer or similar processing device.

The invention will now be described by way of example only, with reference to the accompanying drawings in which.

Figure 4:
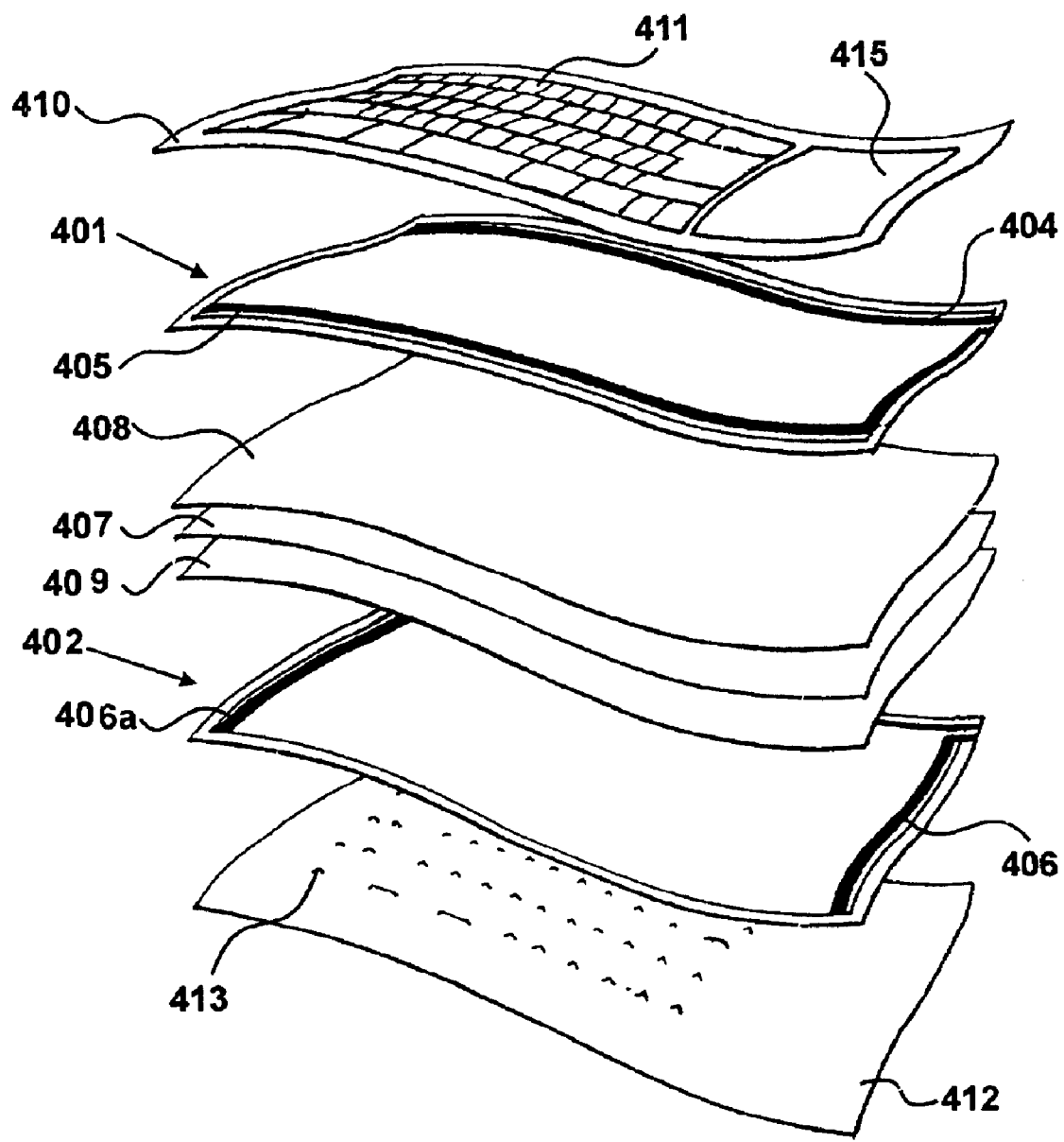
FIG. 4 shows a seven layer device including two fabricated material layers of the type shown in FIG. 3.
Figure 5:
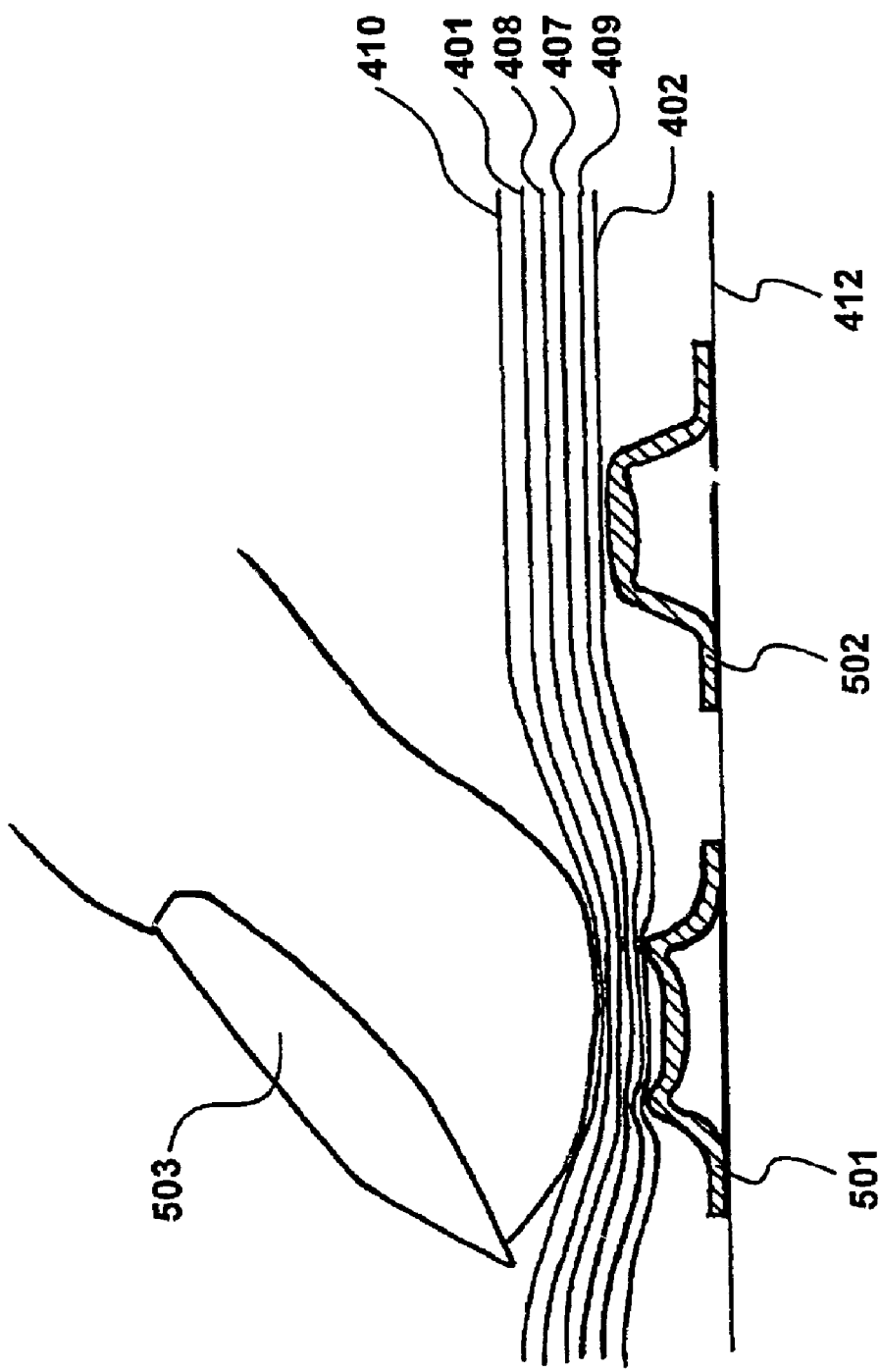
Figure 5A:
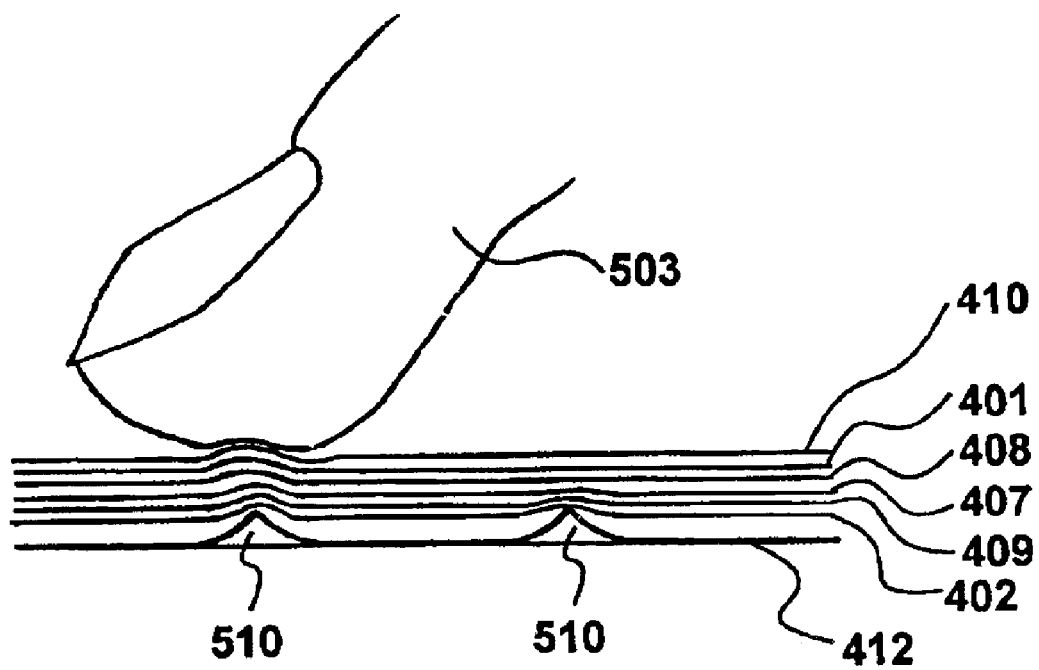
Figure 5B:
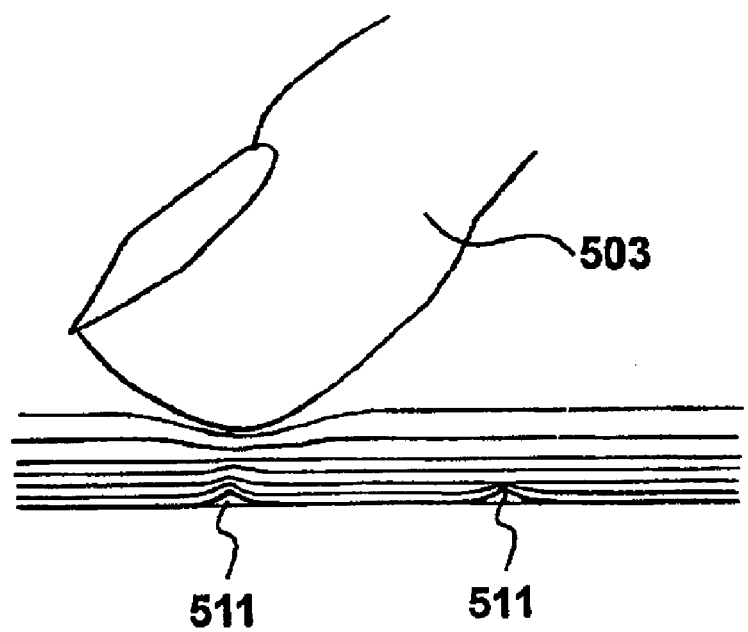

FIG. 5 provides a cross-sectional view of two of the key registration devices of FIG. 4;

FIGS. 5A and 5B show cross-sectional views through alternative key registration devices.

Figure 5C:
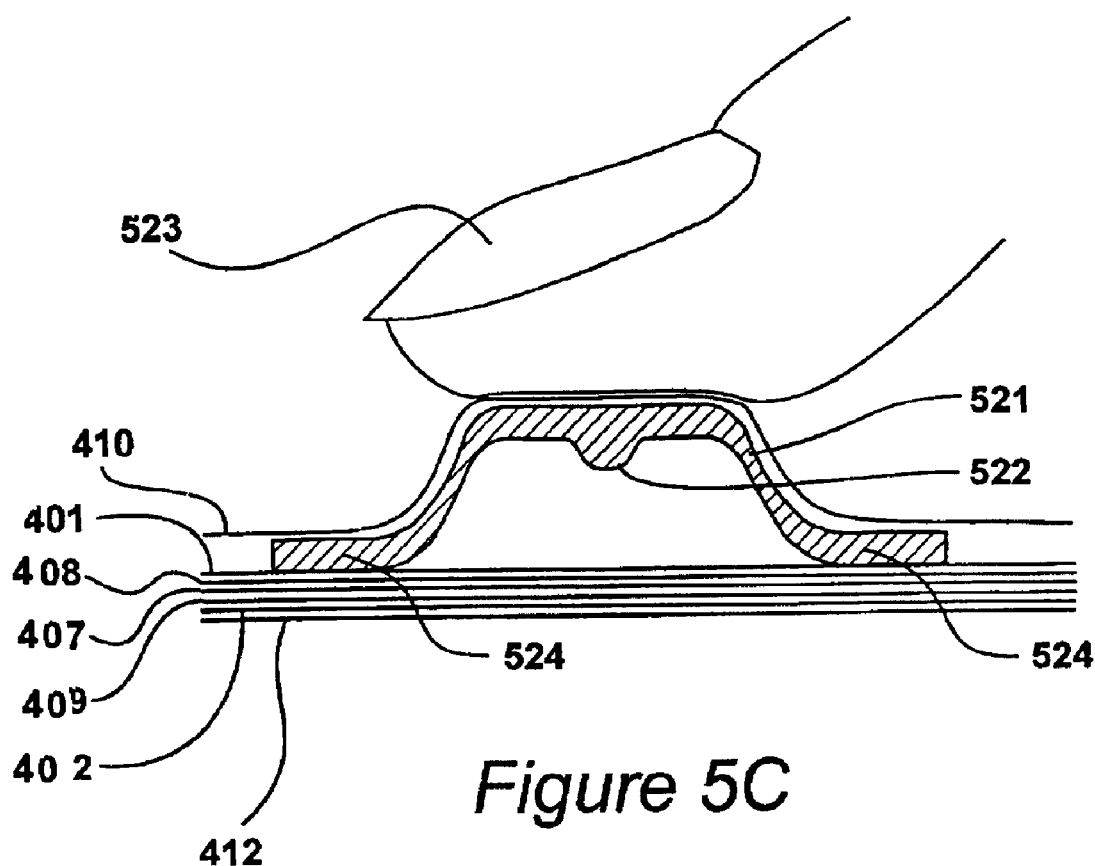
Figure 5D:
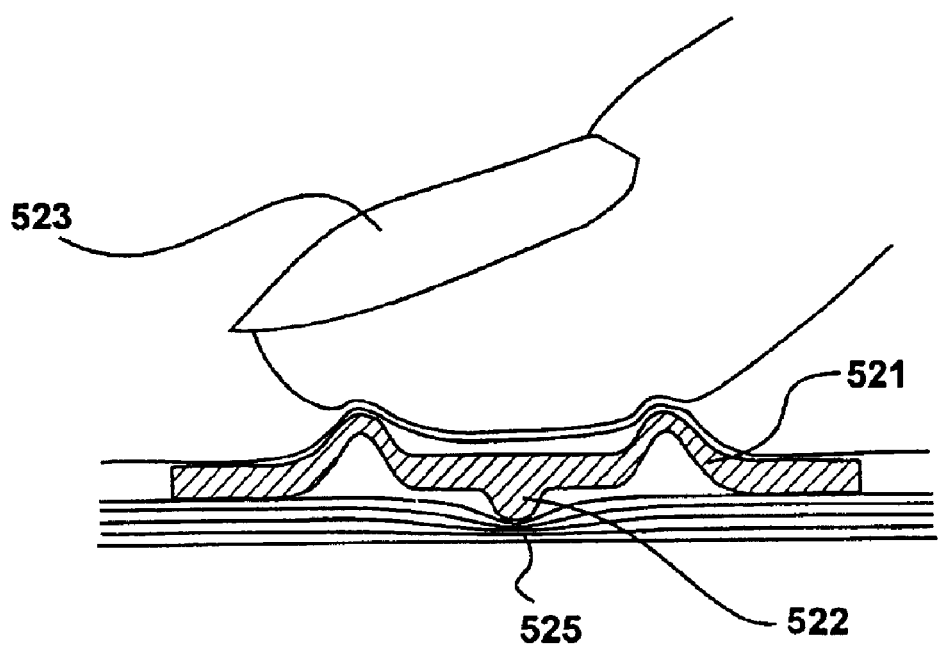

FIGS. 5C and 5D show cross-sectional views through a further alternative key registration device.

Figure 6:
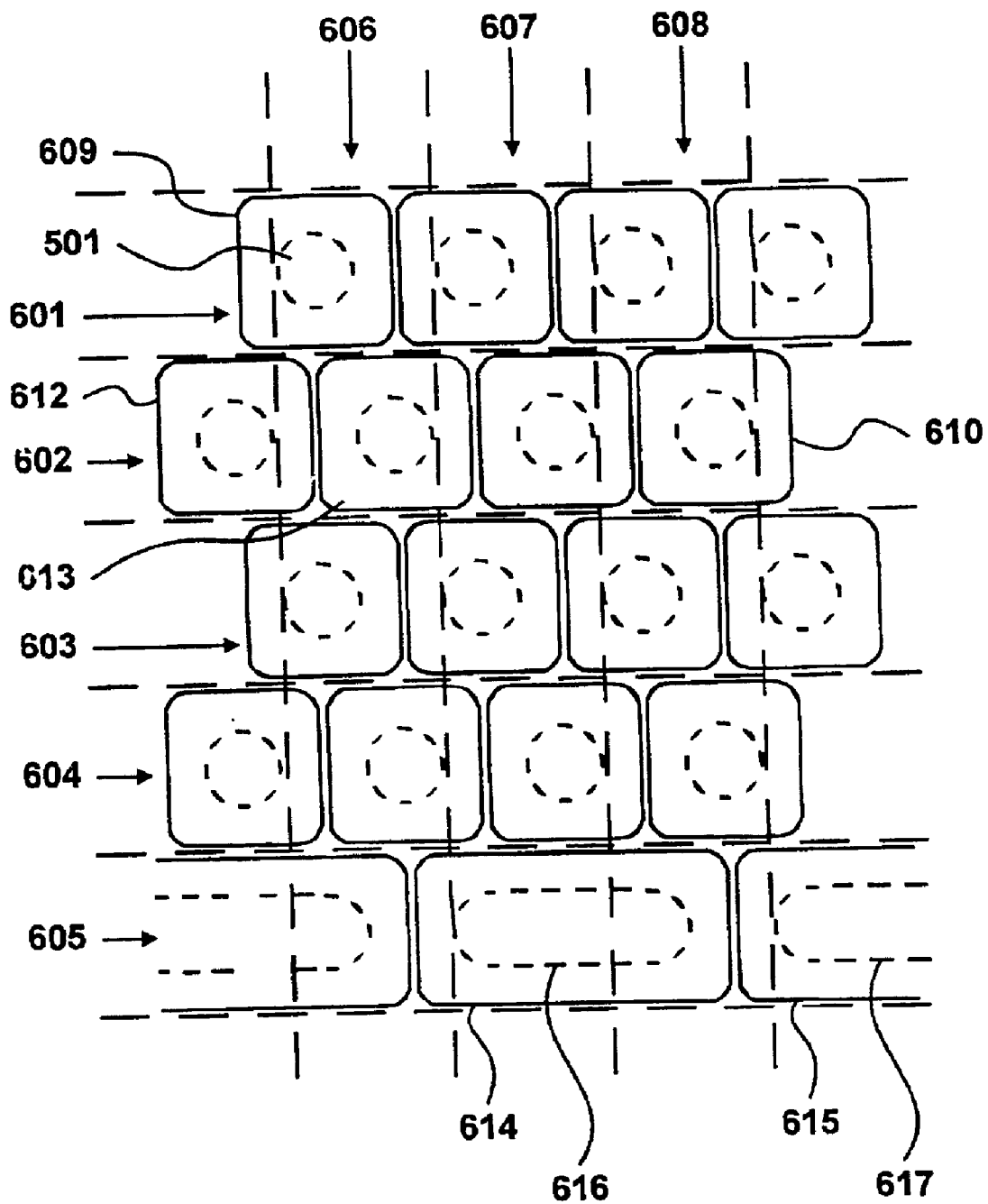
Figure 7B:
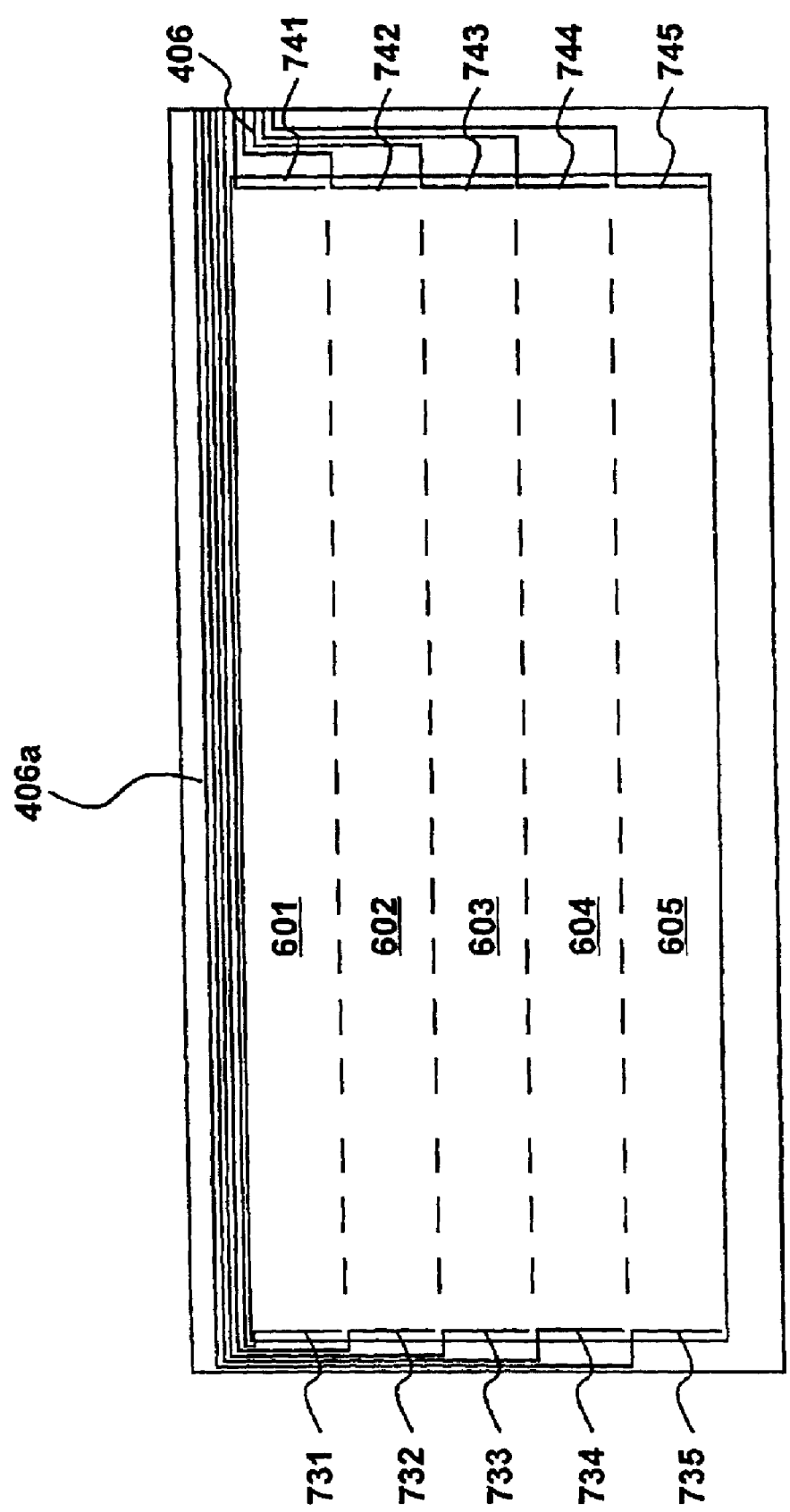
Figure 8:
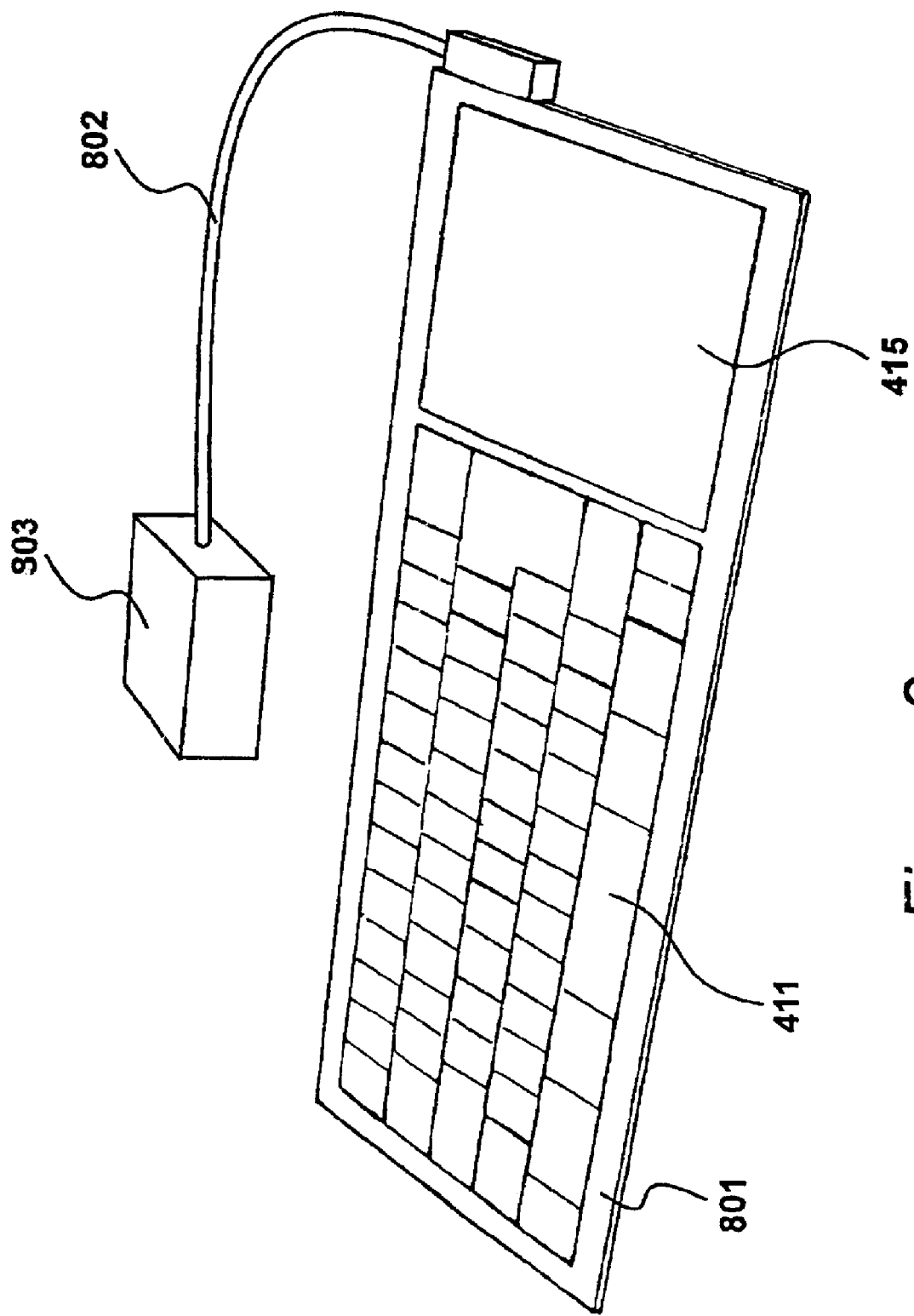
Figure 9:
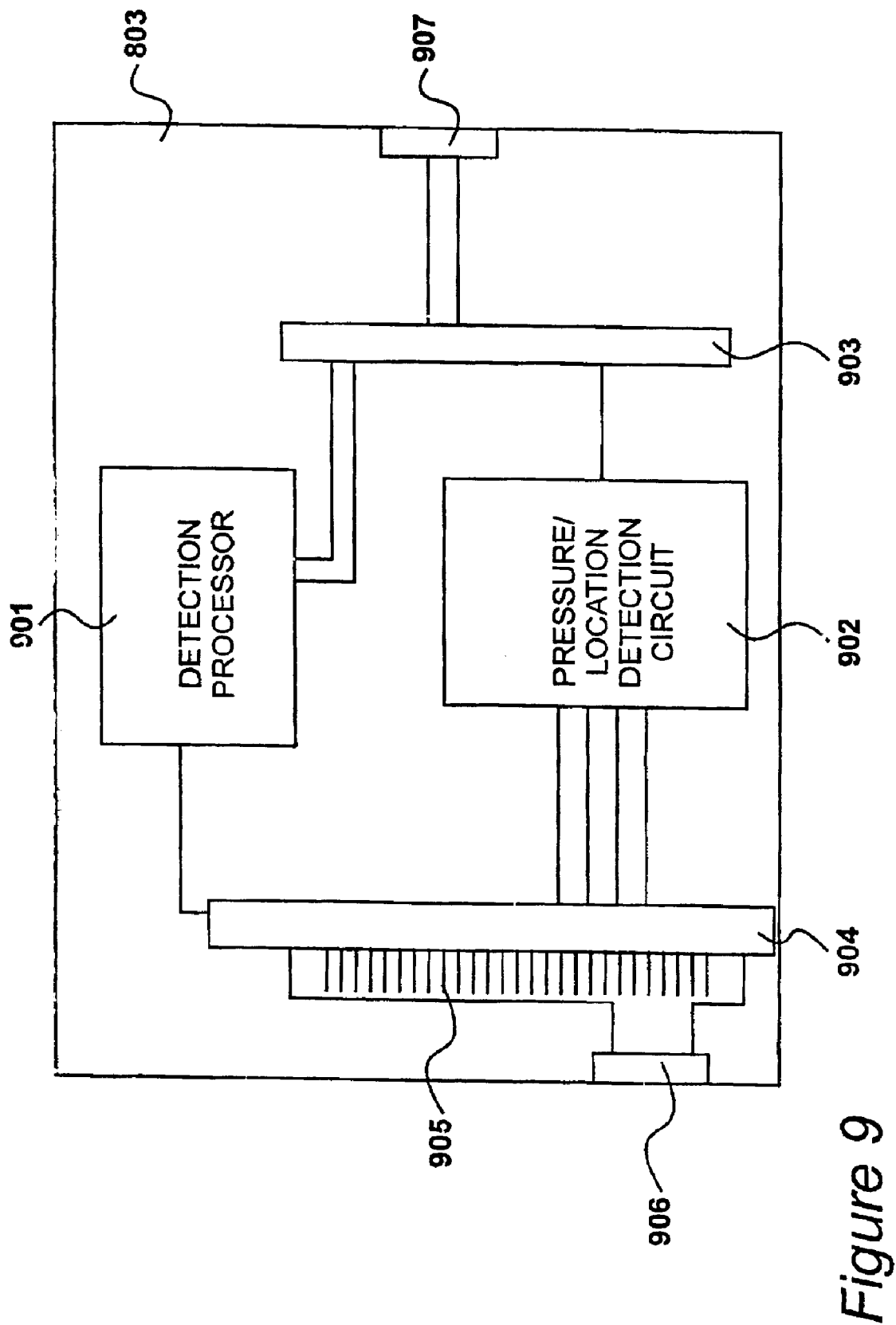
Figure 10:
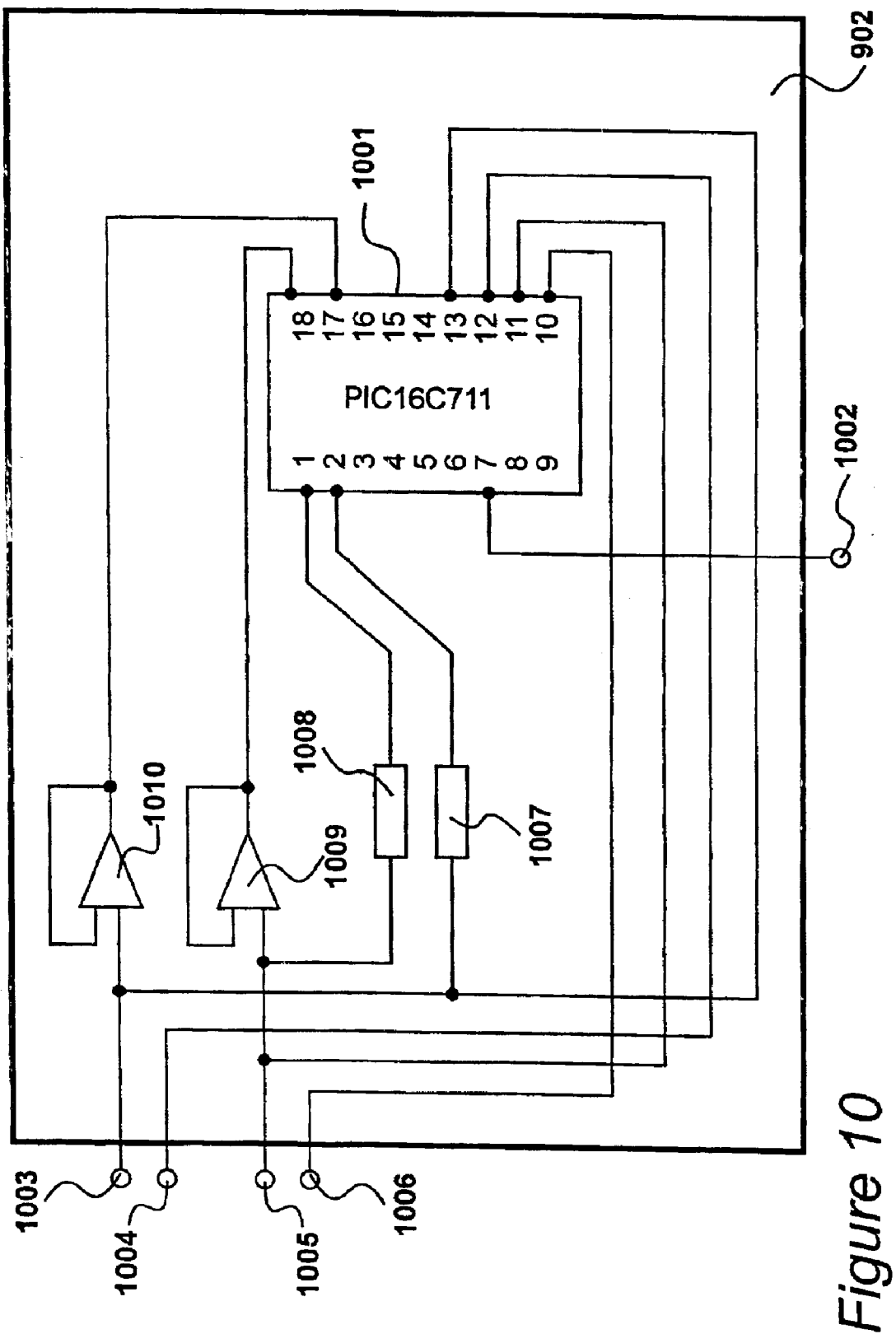
Figure 11A:
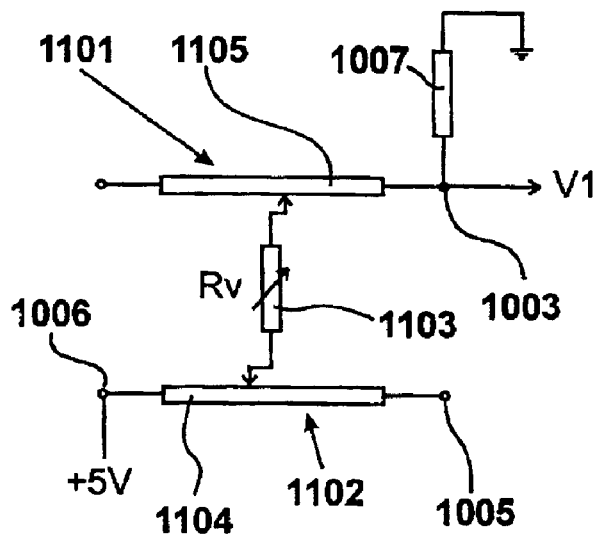
Figure 11B:
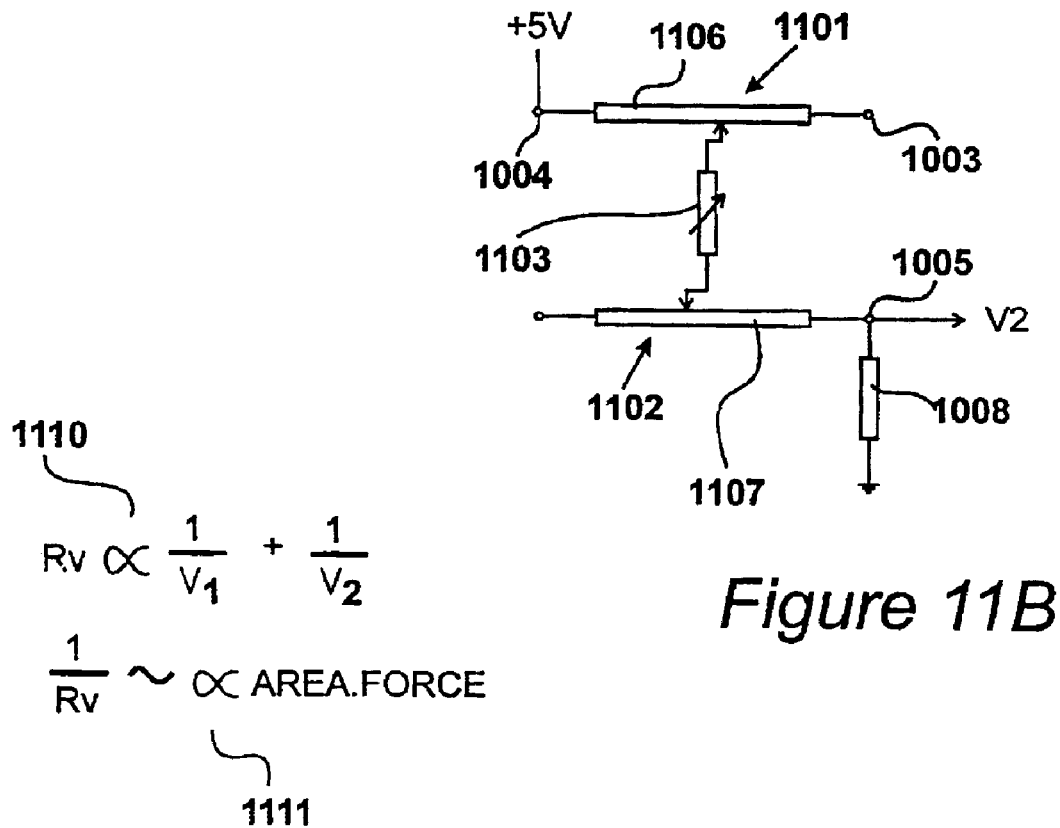
Figure 12:
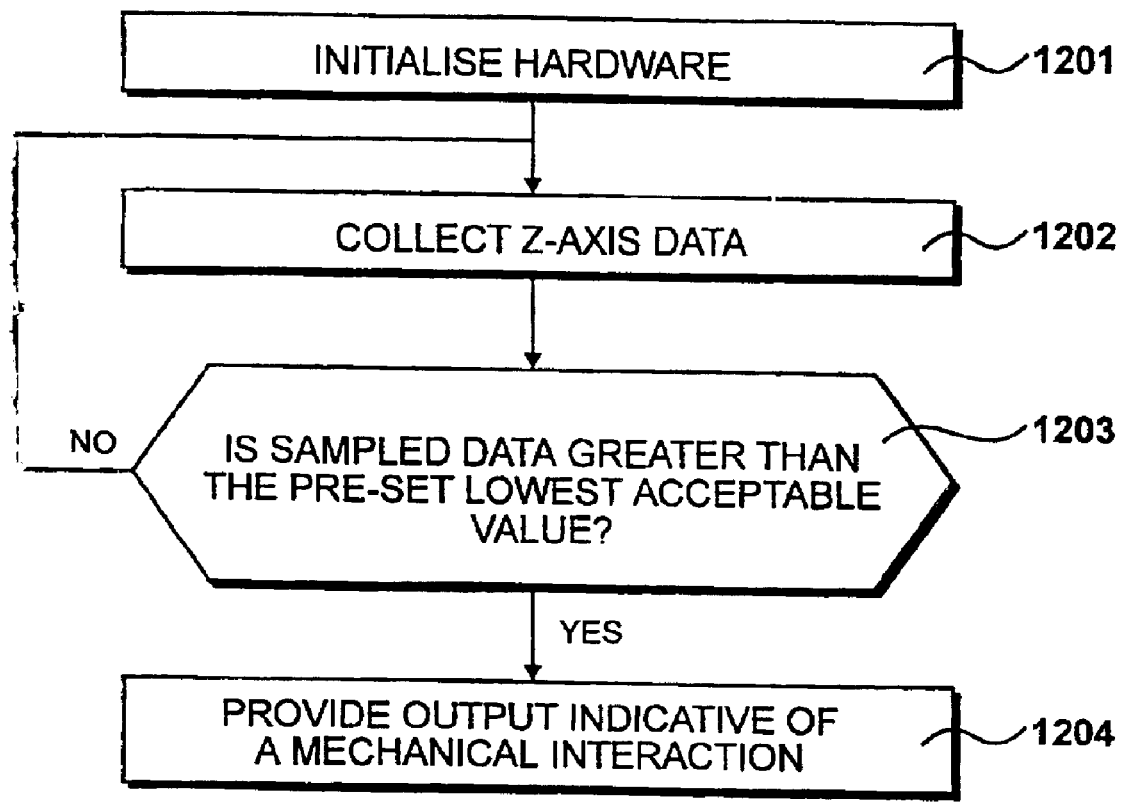
Figure 13:
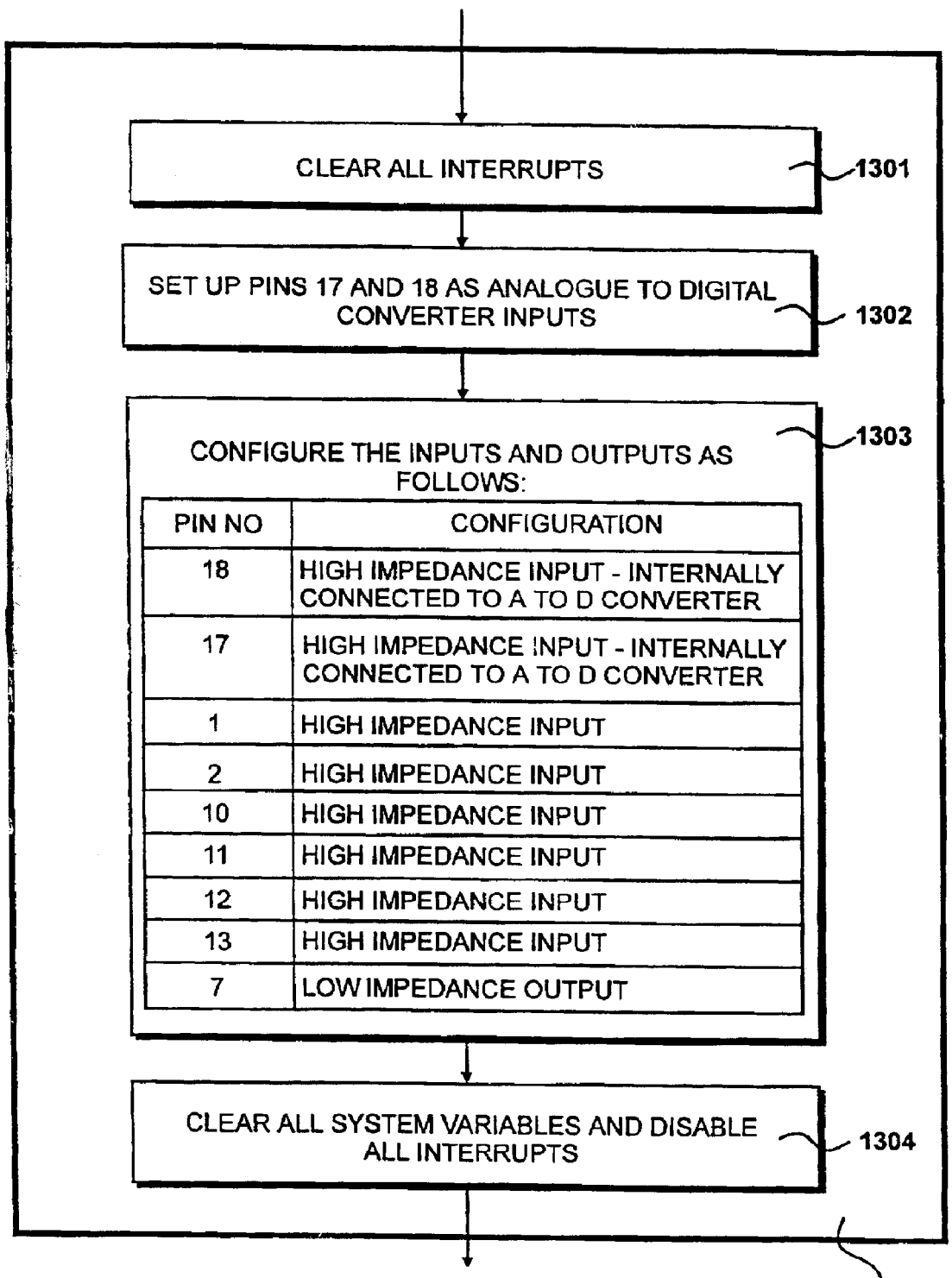
Figure 14:
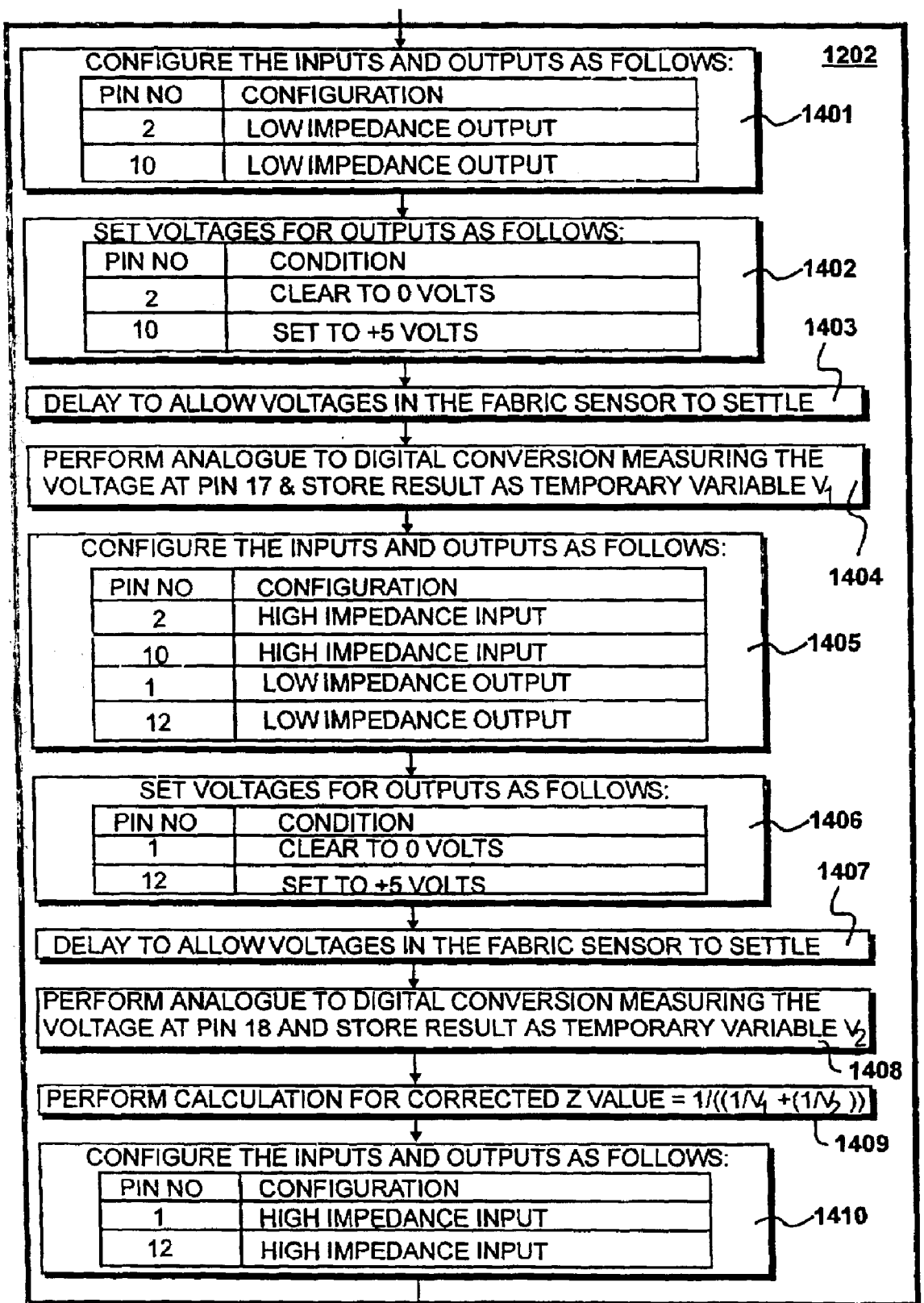
Figure 15A:
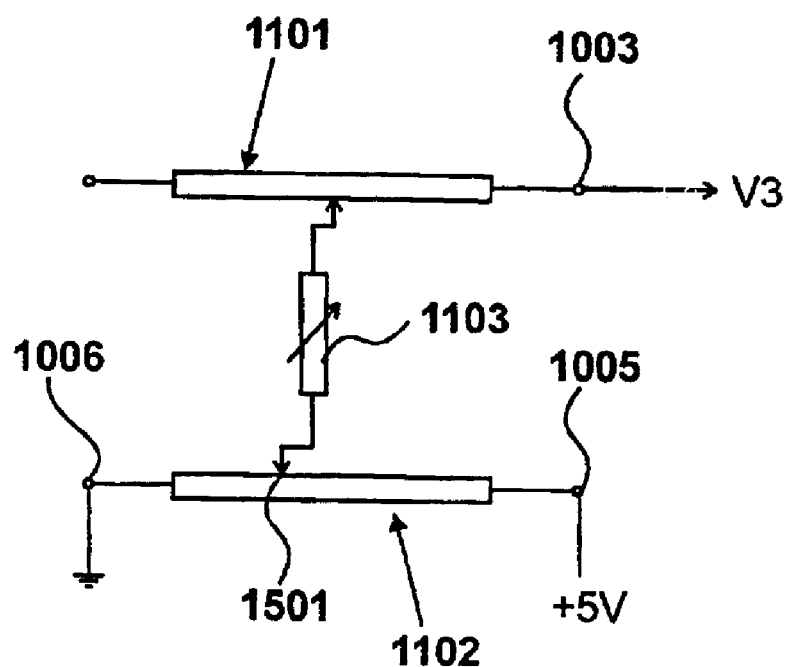
Figure 15B:
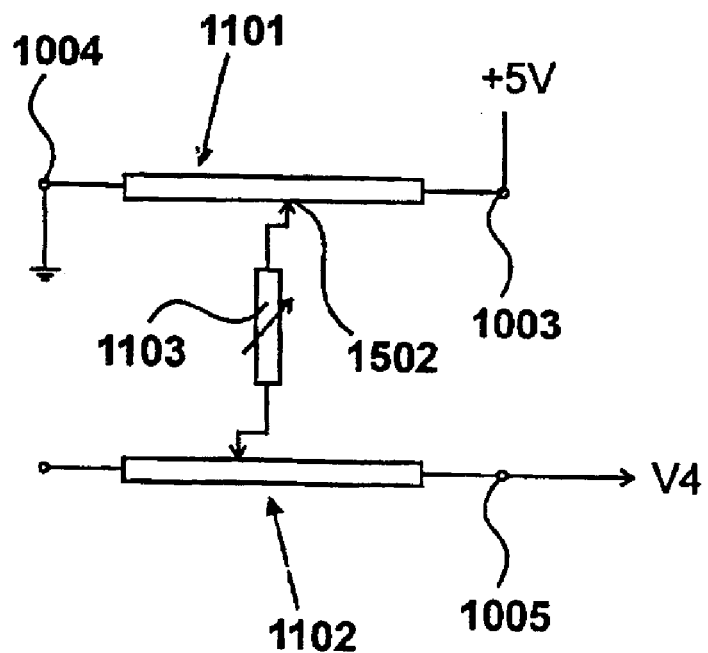
Figure 16:
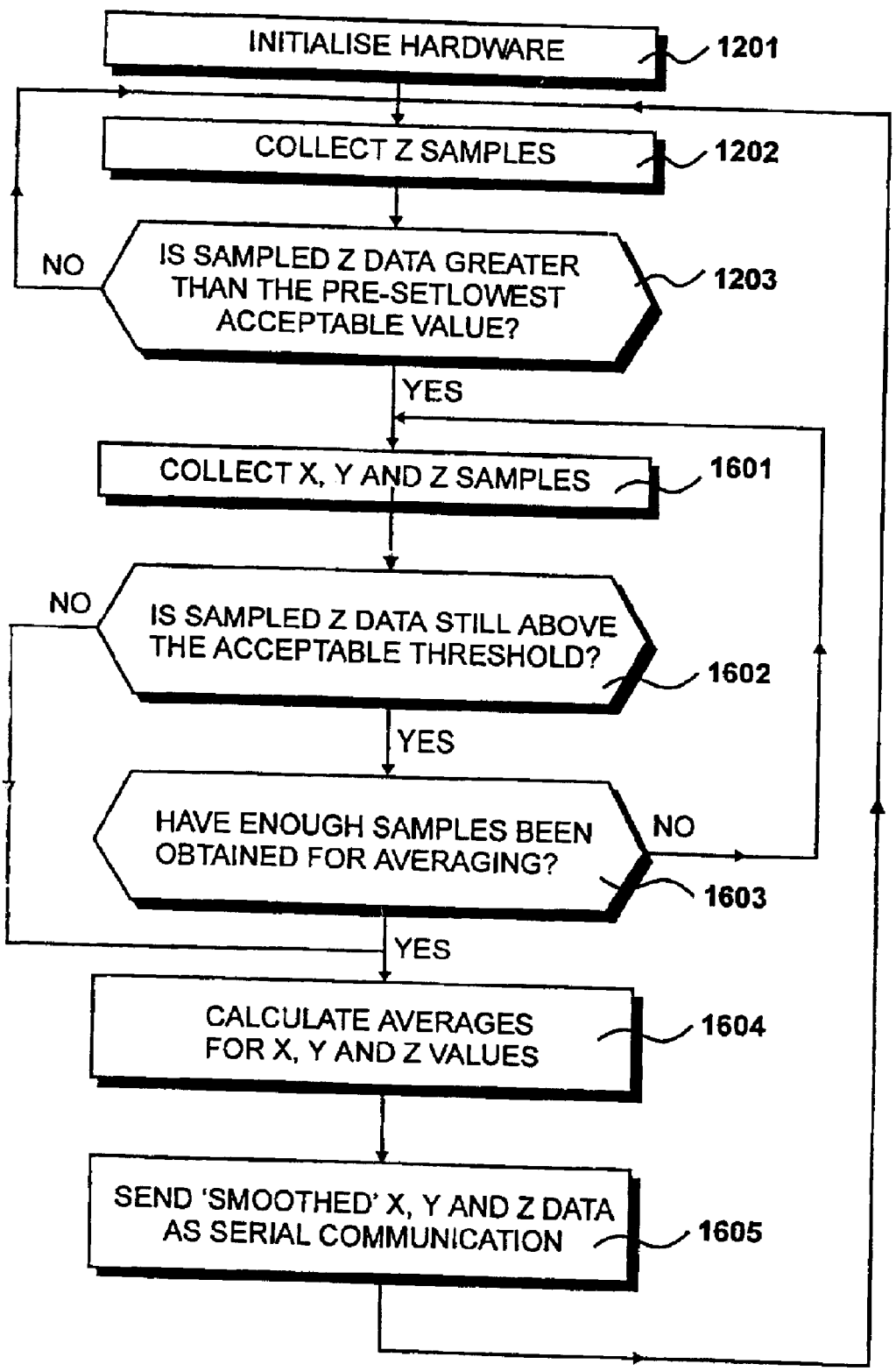
Figure 17:
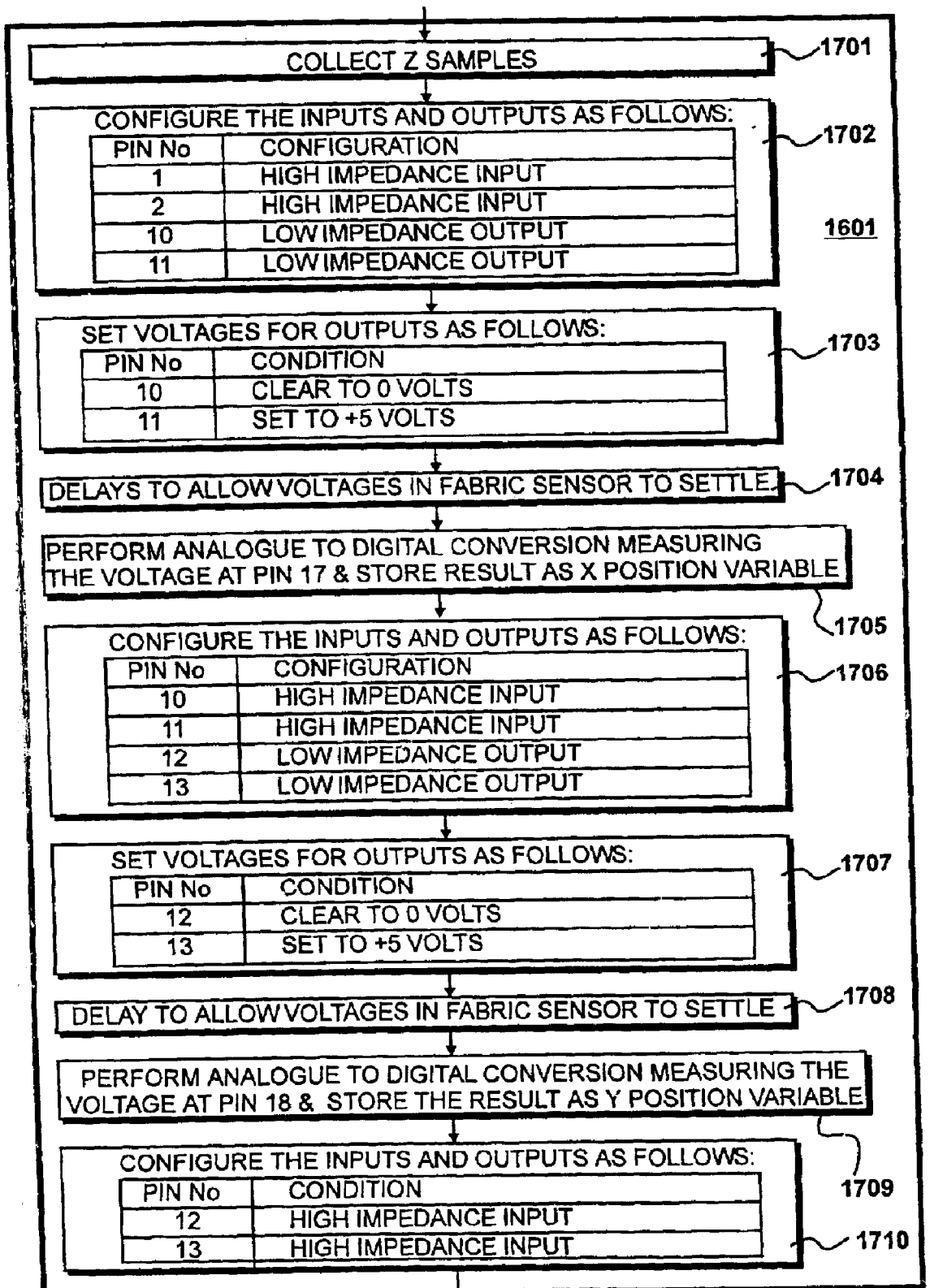
Figure 18:
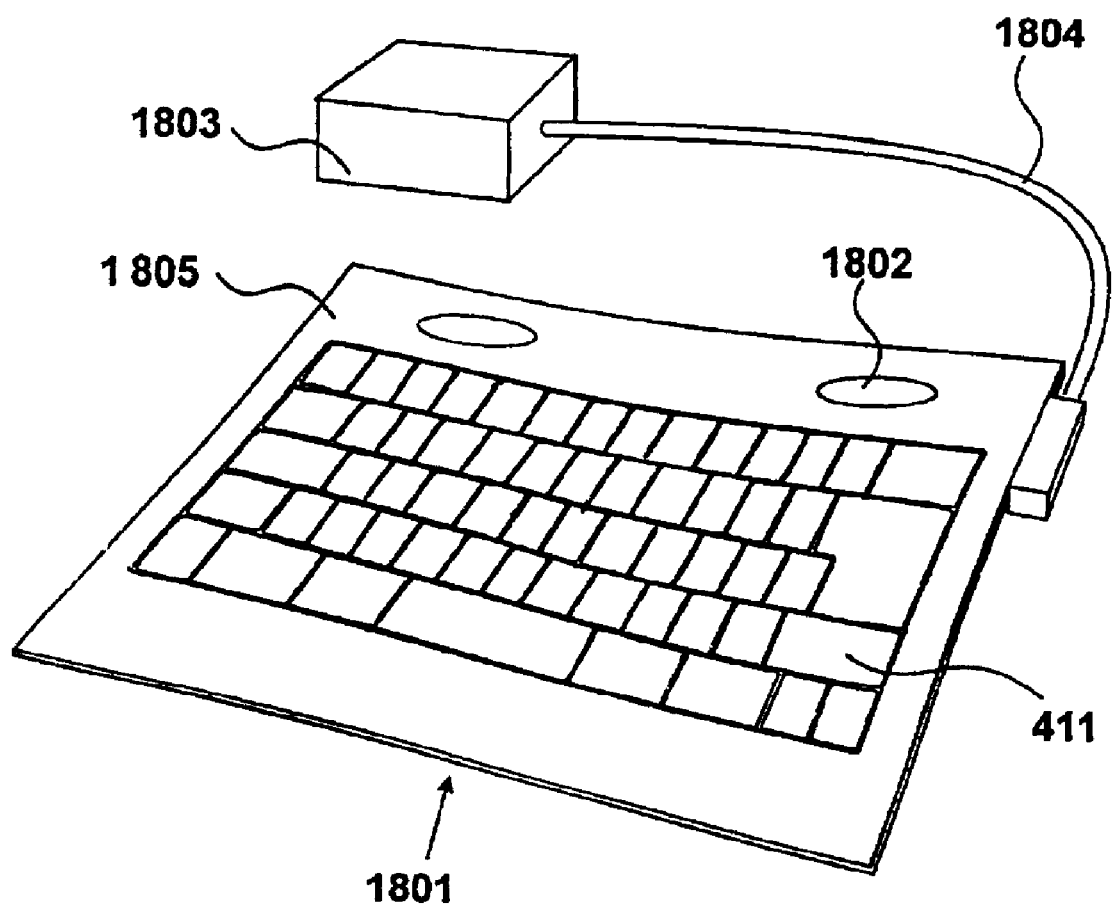
Figure 19:
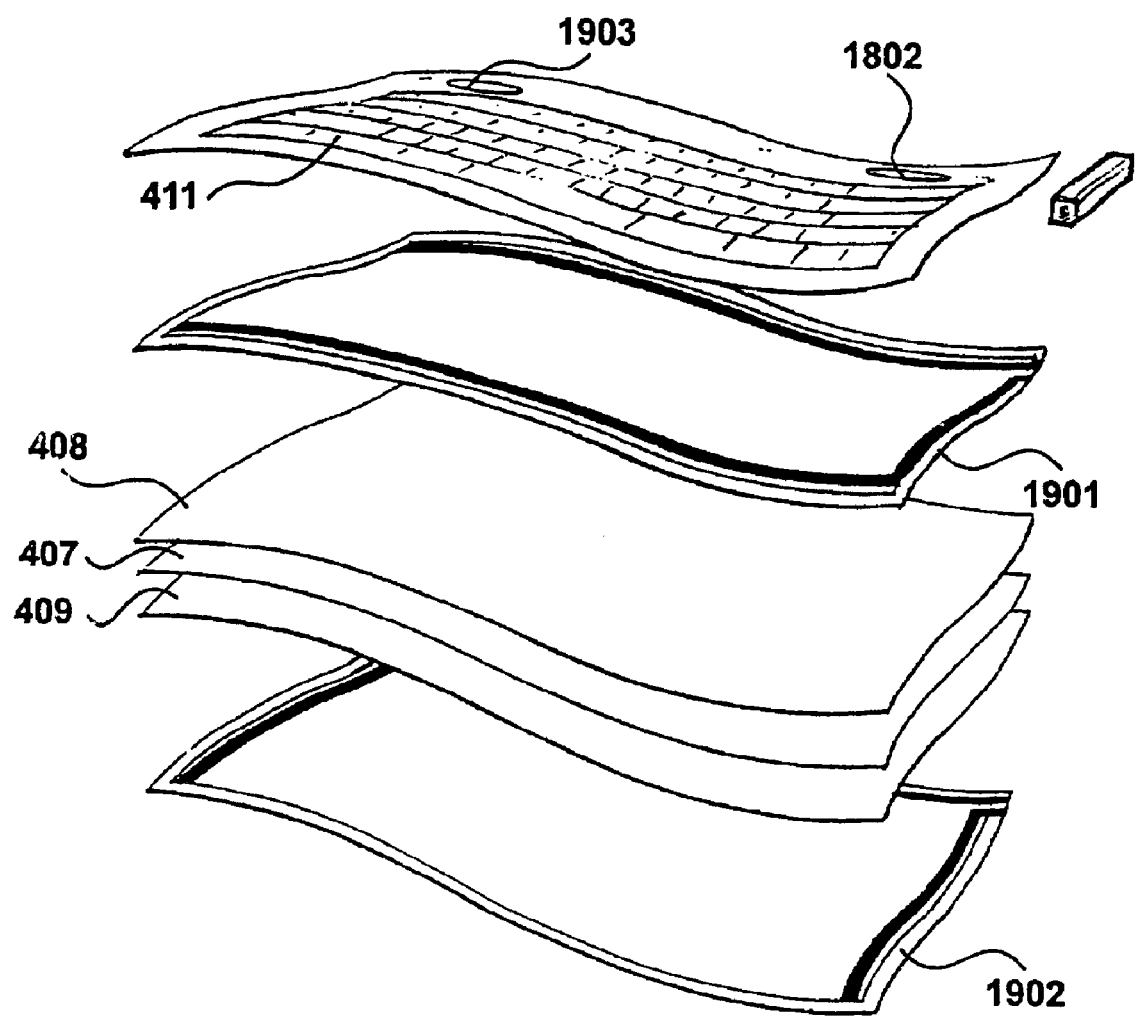
Figure 20A:
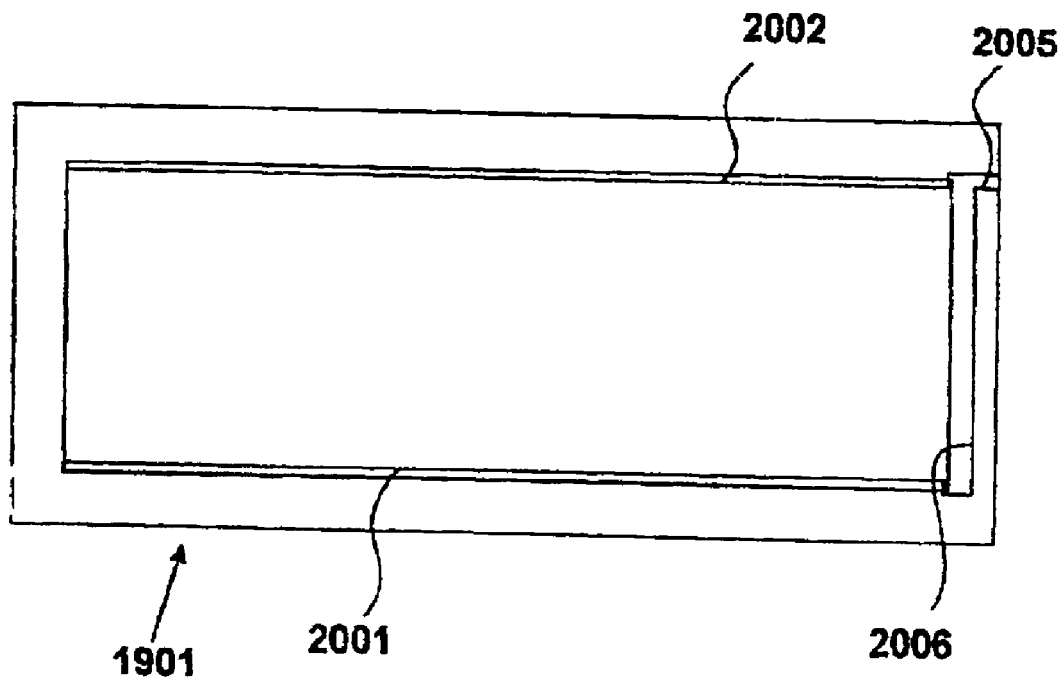
Figure 20B:
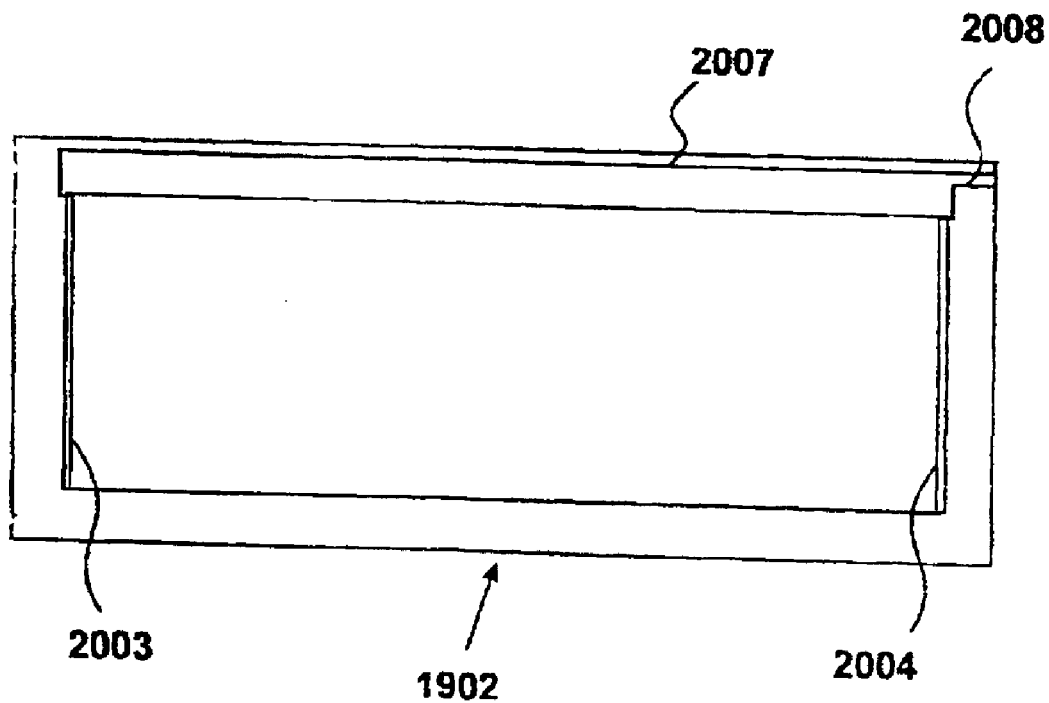
Figure 21:
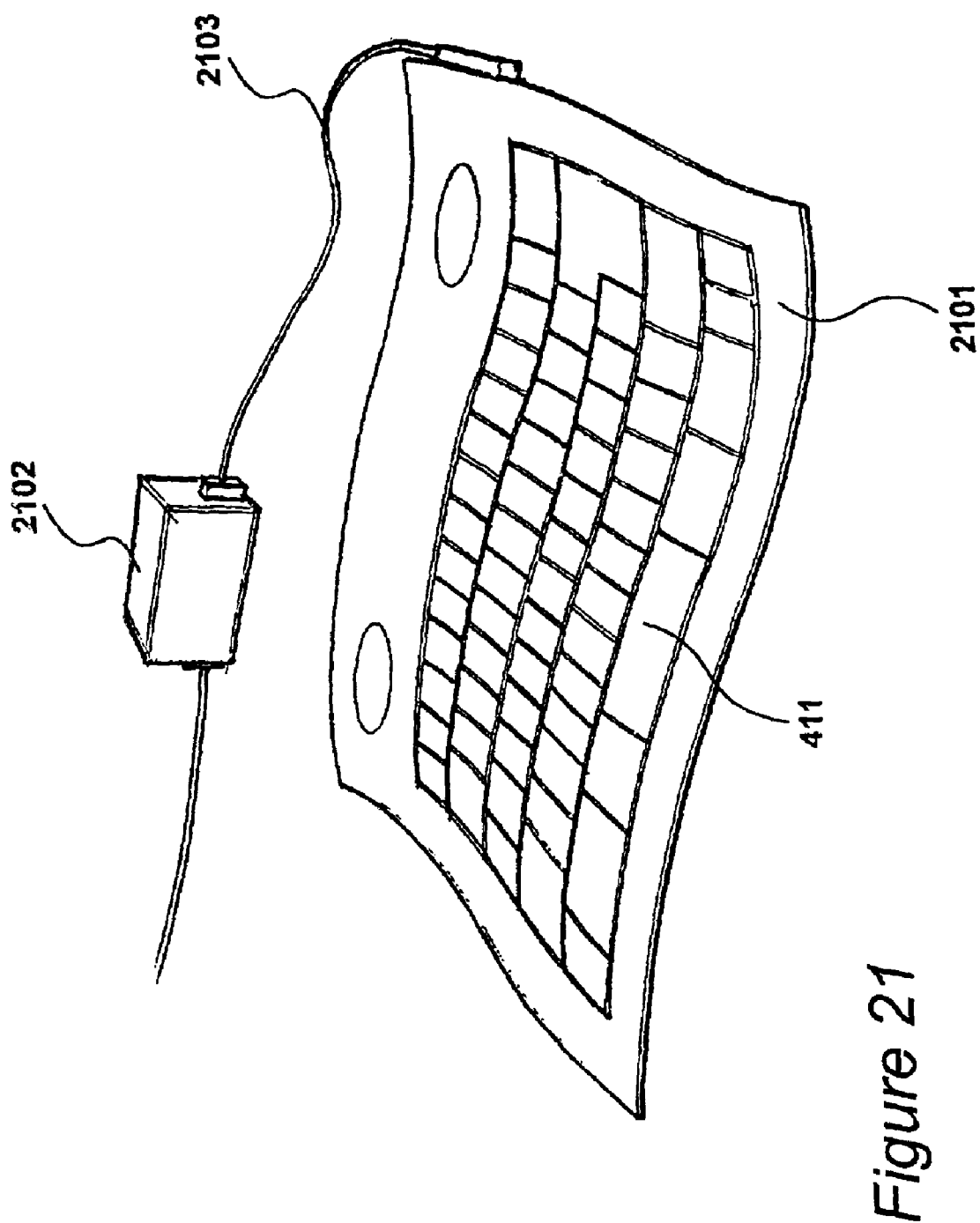
Figure 22A:
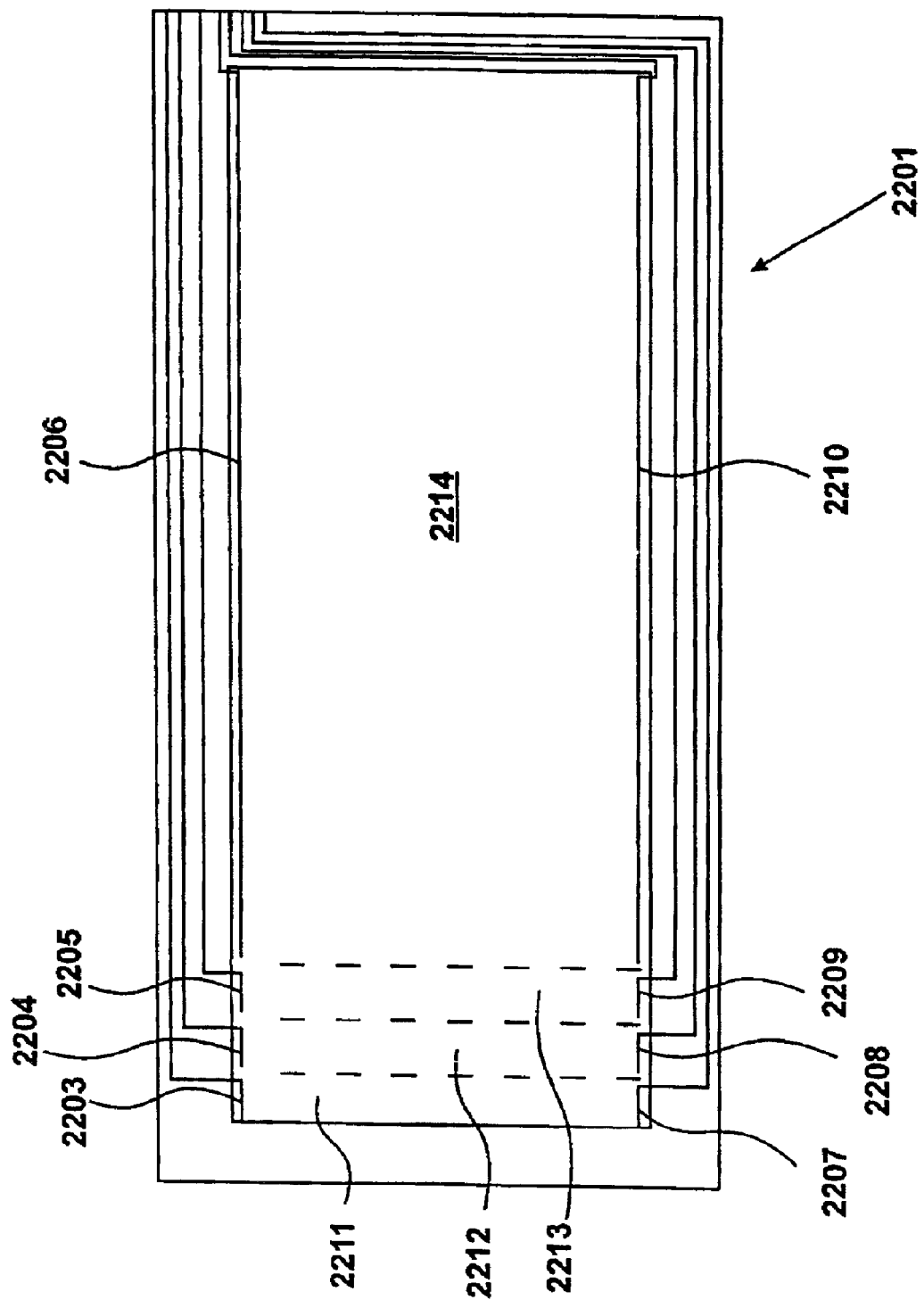
Figure 22B:
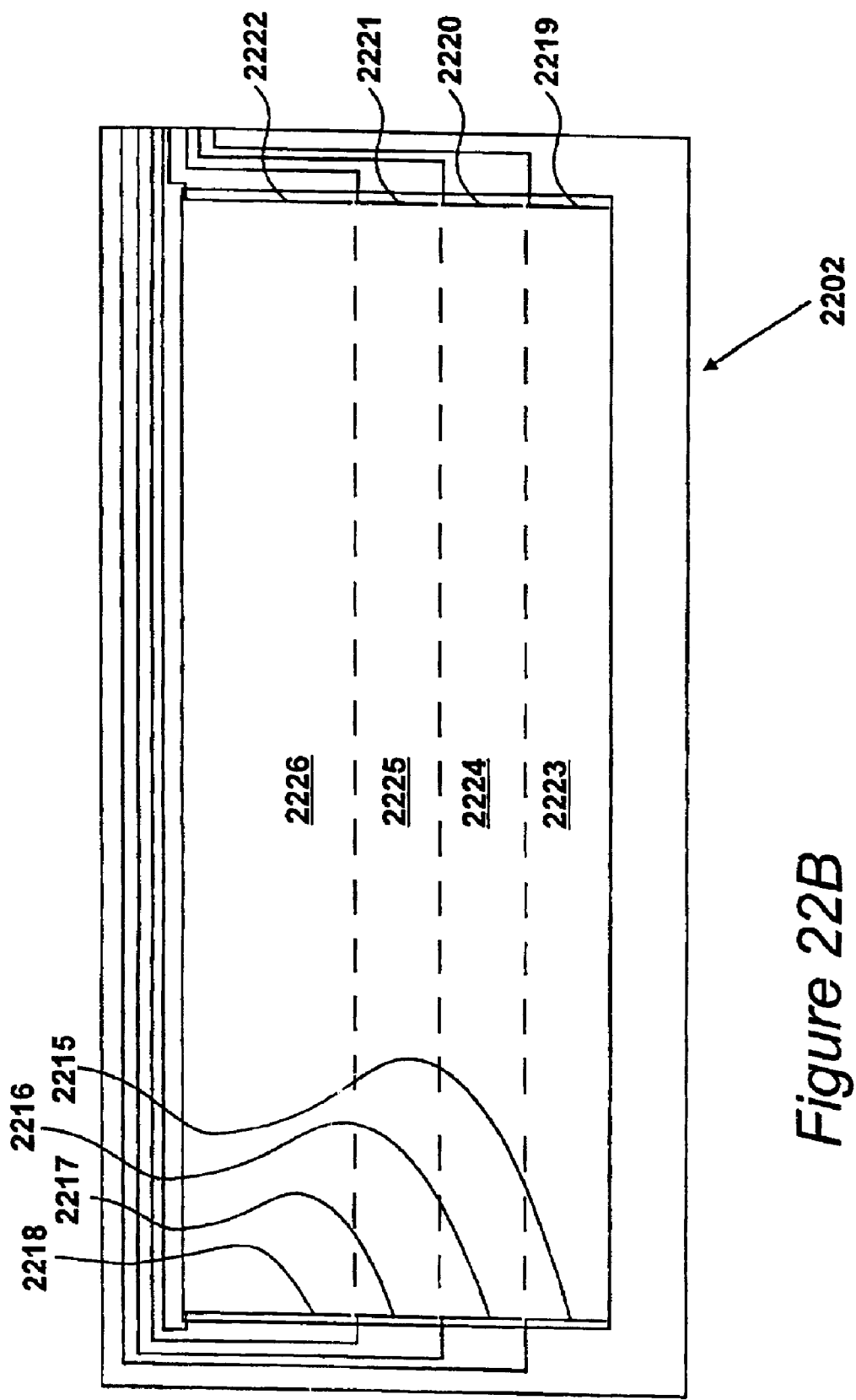

FIG. 6 shows a portion of the alpha-numeric keyboard, demonstrating the registration of the key registration devices, the printed keyboard outline and the conductive bands of conductive layers;

FIGS. 7A and 7B show separately the conductive layers 401 and 402 of FIG. 4;

FIG. 8 shows an assembled alpha-numeric keyboard, assembled from the layers shown in FIG. 4;

FIG. 9 shows a detailed view of the interface circuit of FIG. 8;

FIG. 10 details an example of a pressure/location detection circuit that is incorporated into the interface circuit of FIG. 9;

FIGS. 11A and 11B detail schematically the pressure measurements that can be made by the location/pressure detection circuit identified in FIG. 10;

FIG. 12 is a flow chart illustrating a mode of operation performed by the PIC16C711 processor shown in FIG. 10;

FIG. 13 is a flow chart detailing the initialisation procedure performed by the PIC16C711 processor shown in FIG. 12;

FIG. 14 is a further flow chart detailing the configurations of the PIC16C711 processor for the collection of Z value data as indicated in step 1202 of FIG. 12;

FIGS. 15A and 15B detail schematically the X and Y positional co-ordinate measurements that can be made by the location/pressure detection circuit identified in FIG. 10;

FIG. 16 is a flow chart detailing a further mode of operation of the PIC16C711 processor;

FIG. 17 is a flow chart detailing the configuration of the PIC16C711 processor for the collection of X, Y co-ordinate positional data and Z axis data as indicated in step 1601 of FIG. 16;

FIG. 18 Shows an alternative alpha-numeric keyboard, to that of FIG. 8;

FIG. 19 provides an exploded view of the layered structure of the device shown in the FIG. 18;

FIGS. 20A and 20B show separately the conducting layers of the device of FIG. 18;

FIG. 21 shows a further alternative alpha-numeric keyboard embodying the present invention;

FIGS. 22A and 22B show an exploded view of the alpha-numeric keyboard of FIG. 21.

Figure 23:
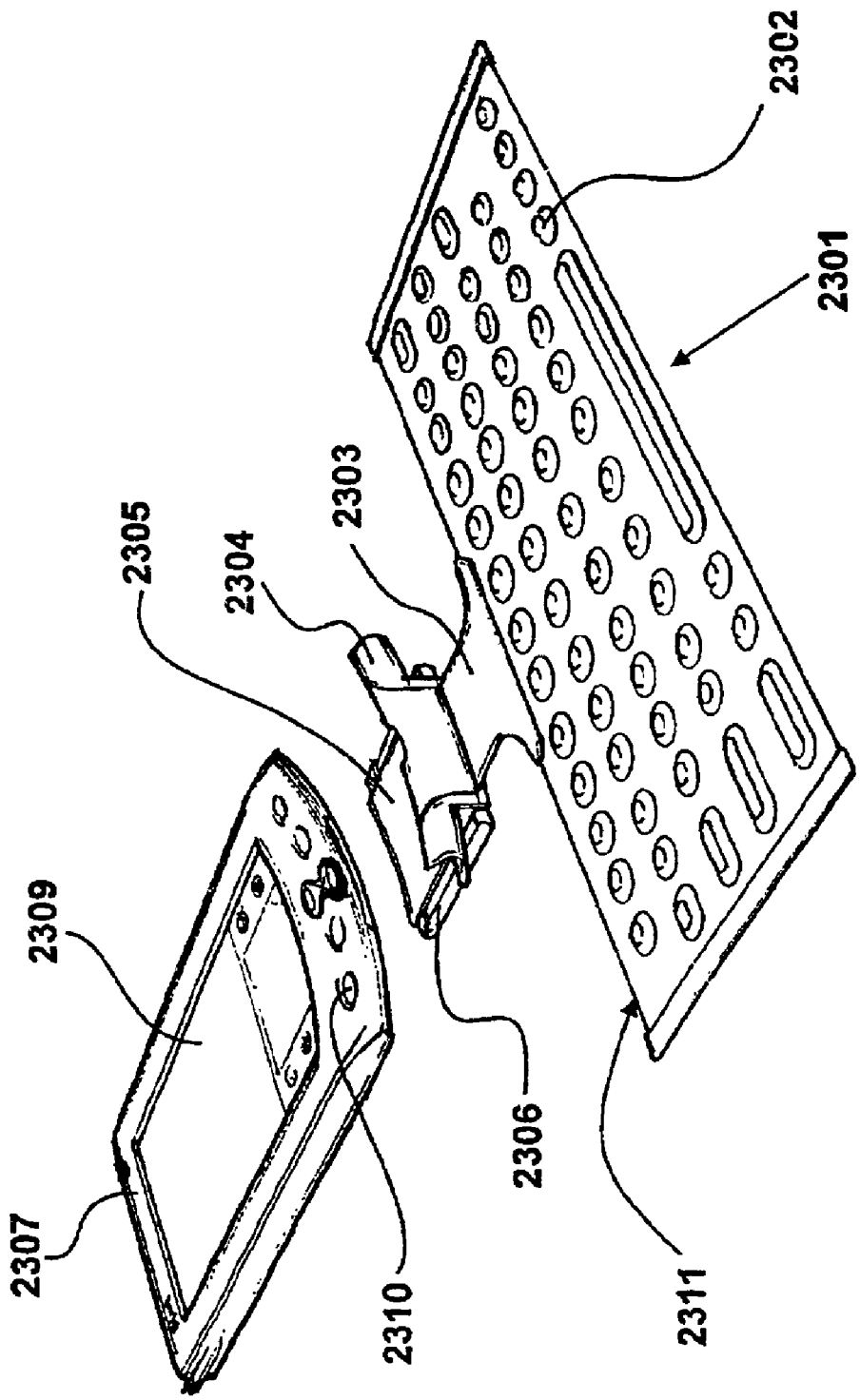
Figure 24:
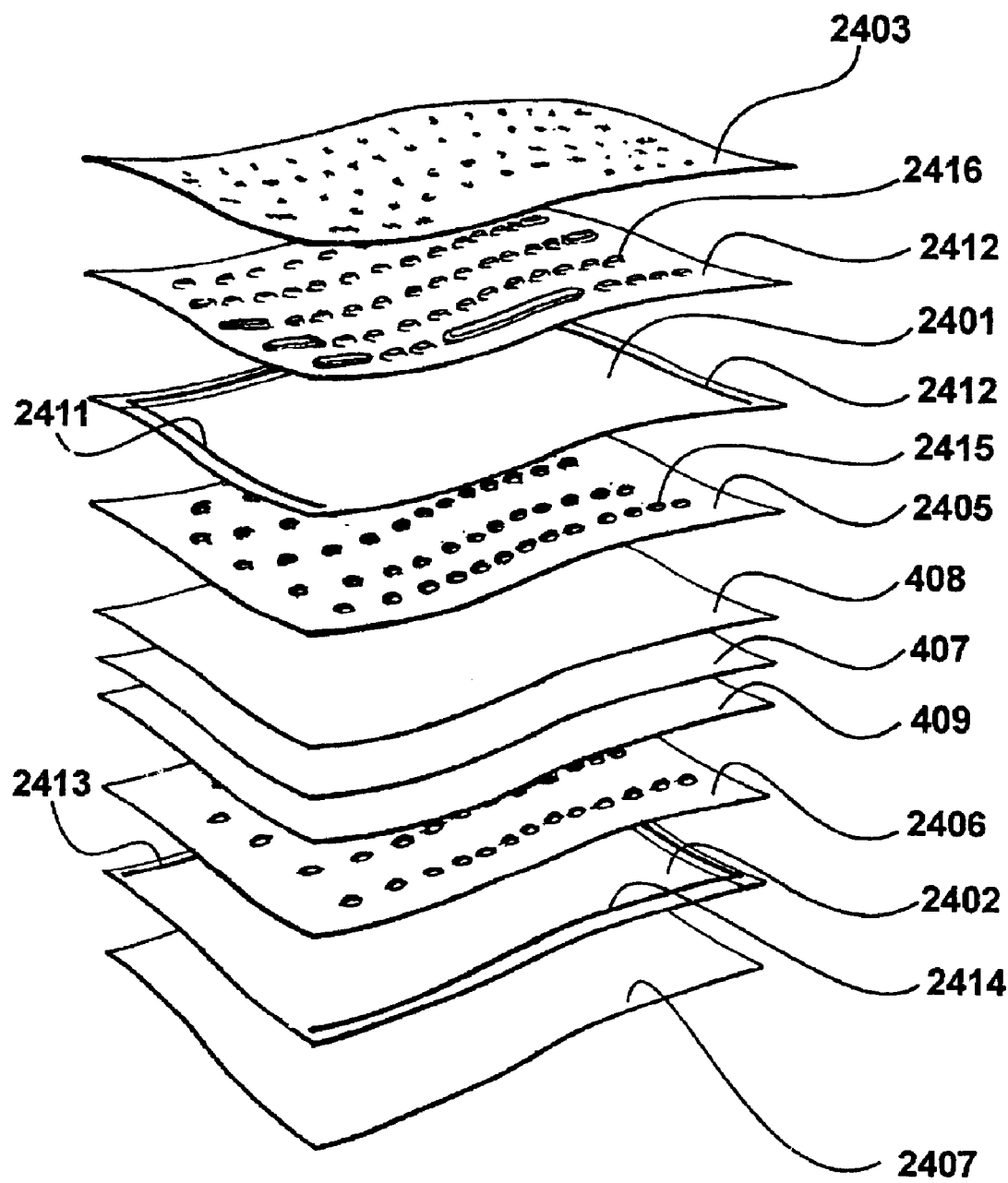
Figure 25A:
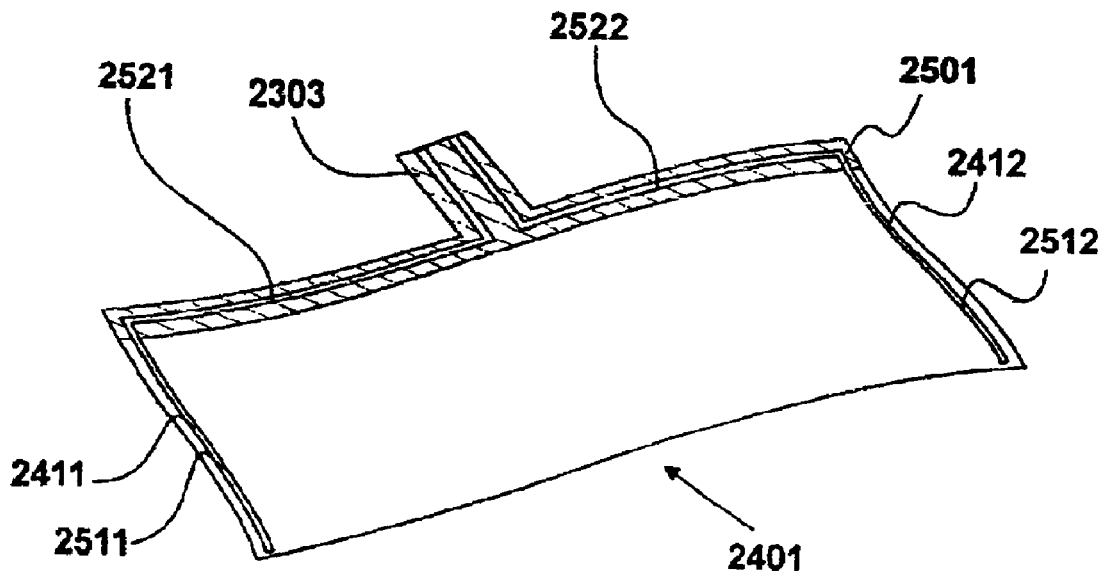
Figure 25B:
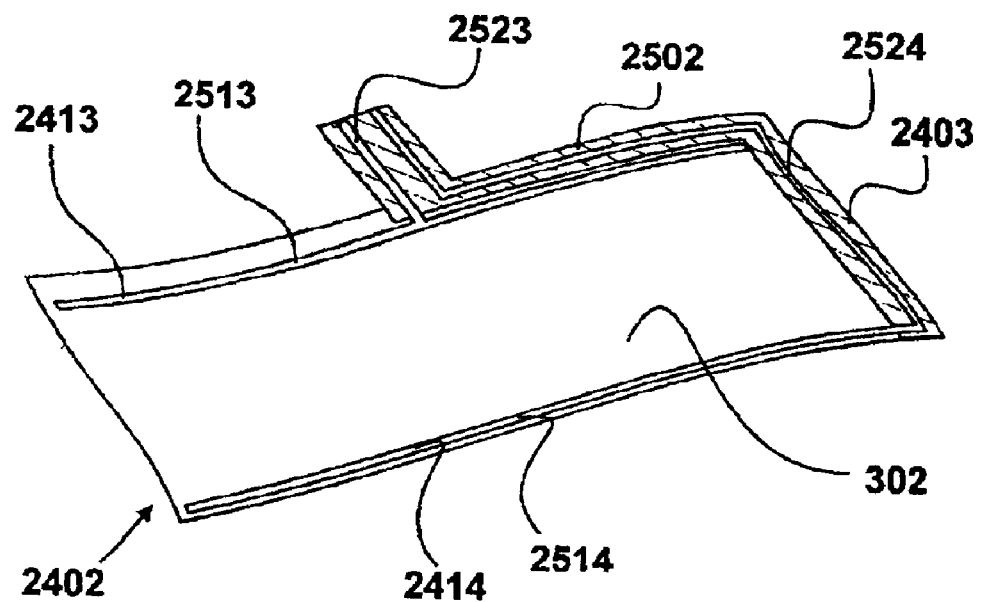

FIG. 23 shows a further alternative alpha-numeric keyboard embodying the present invention;

FIG. 24 provides an exploded view of the alpha-numeric keyboard of FIG. 21 showing the individual layers that make up the device;

FIGS. 25A and 25B show separately the conductive layers 2401 and 2402 of FIG. 24.

Figure 26A:
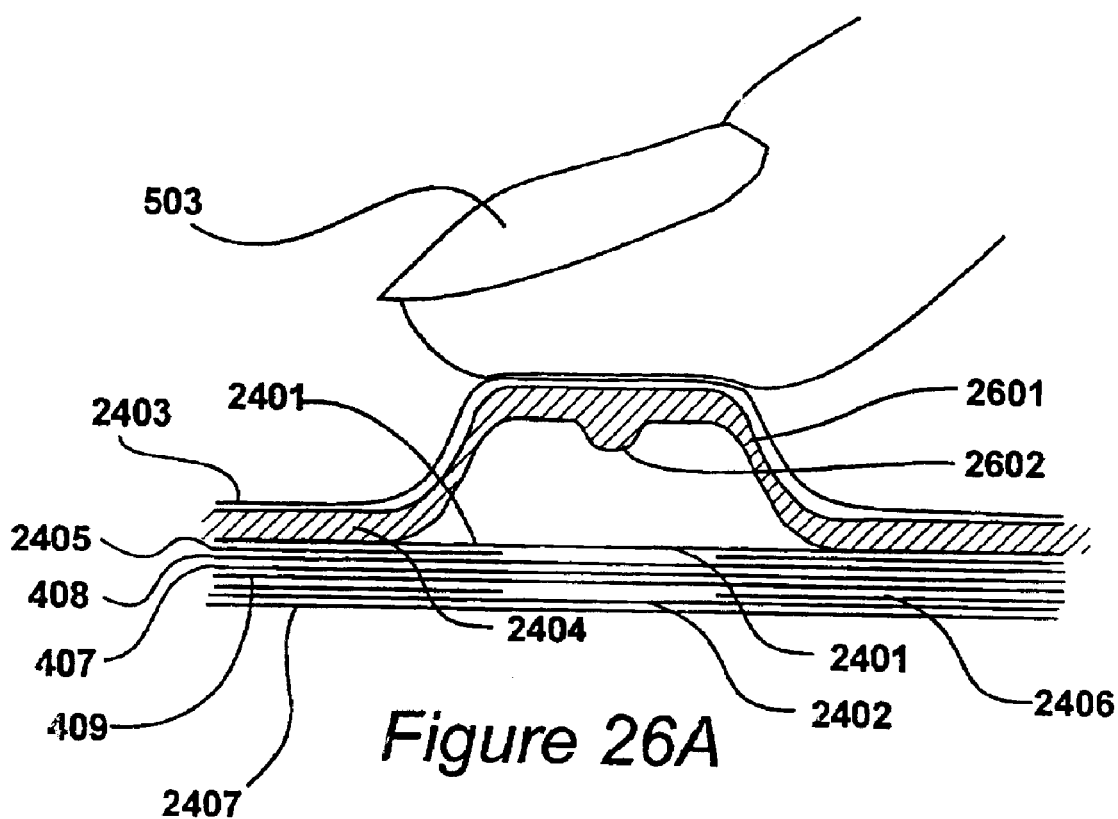
Figure 26B:
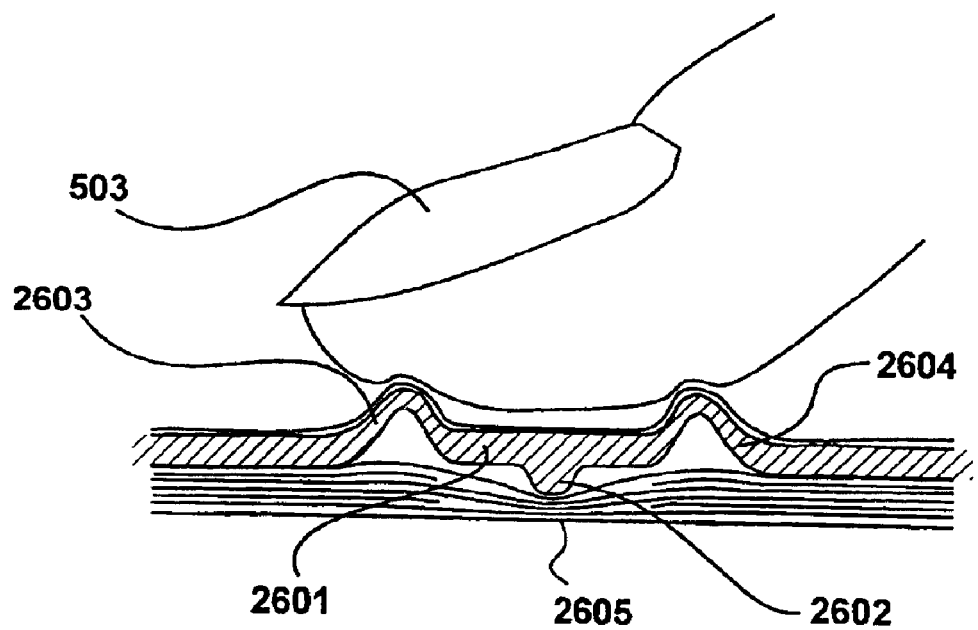

FIGS. 26A and 26B show a cross sectional view through a key registration device of the fabric keyboard 2301 shown in FIG. 23 in the unpressed and pressed configurations.

Figure 27:
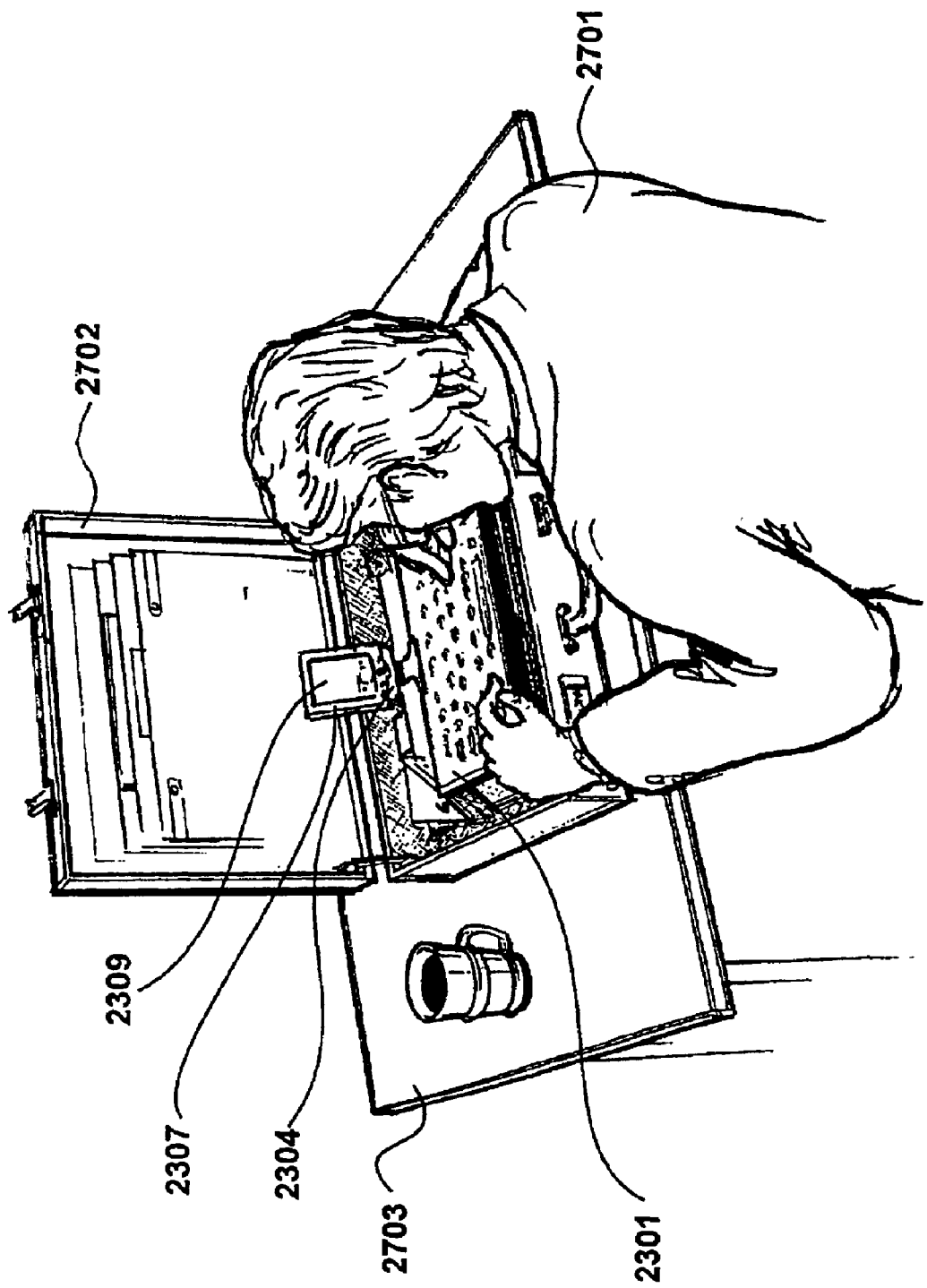

FIG. 27 shows the keyboard device shown in FIG. 23 in use.

FIG. 1

Figure 1:
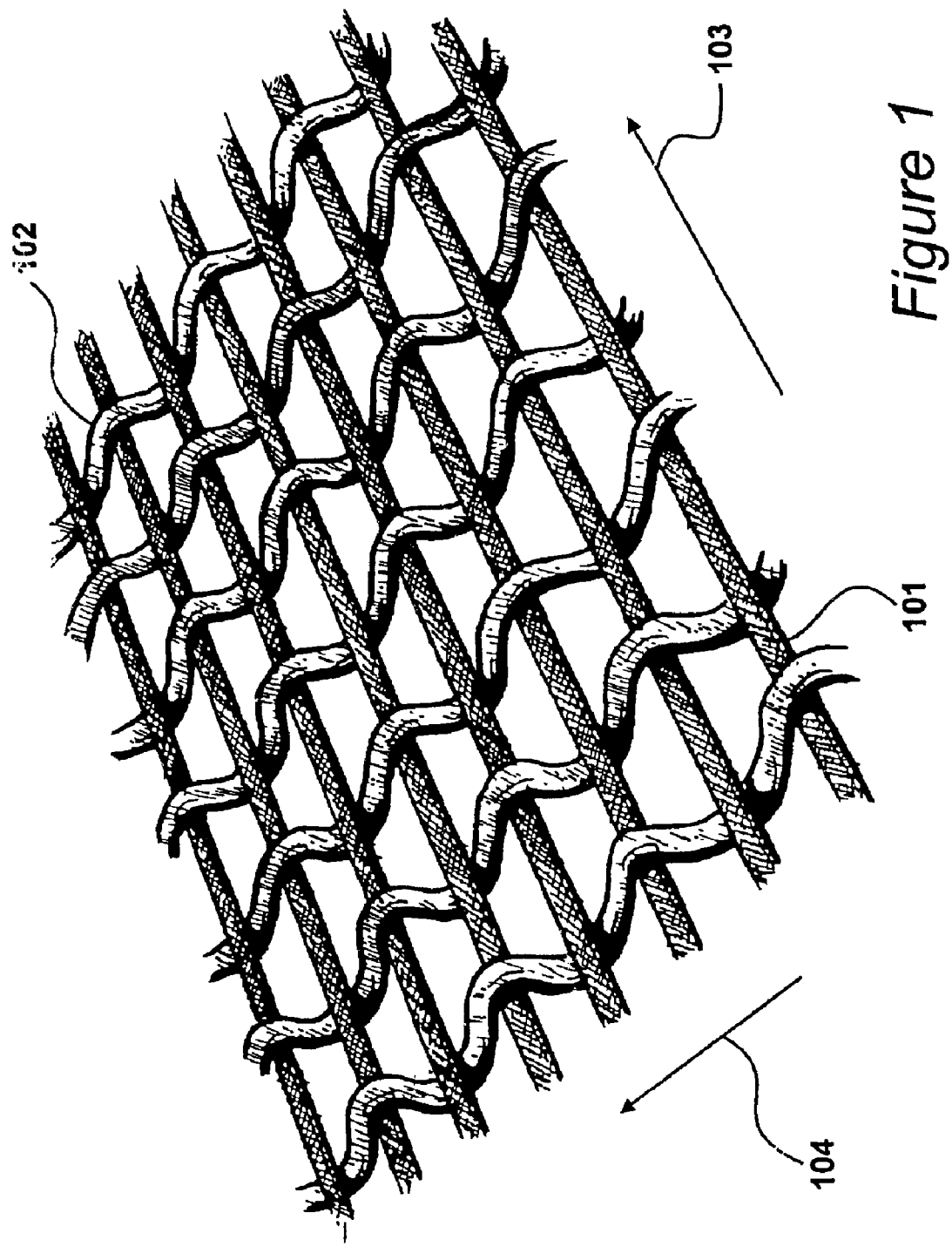
FIG. 1 shows a woven fabric of a type suitable for application in an alpha-numeric keyboard.

A woven fabric is shown in FIG. 1 of a type suitable for application in an alpha-numeric keyboard made in accordance with the present invention. The woven fabric has warp yarns 101 made from single filaments of carbon coated nylon-6, available from BASF under the trademark "RESISTAT" and identified by the designation F901. F901 is a fibre produced primarily for use in static dissipation applications in fabrics. Many different sizes of filament may be employed, dependant upon the requirements of an application, and in this example the size of the filaments is twenty-four decitex, (24 grams per 10,000 m) presenting a diameter of fifty-two micrometers.

Weft fibres 102 are fabricated from a polyester yarn of similar dimensions to the warp. These polyester weft yarns are non-conductive such that the resulting fabric is conductive along the warp, in direction 103 but not conductive in the orthogonal weft direction, as illustrated by arrow 104. Thus, due to the nature of the weave of the material, each conductive warp yarn 101 is separated from adjacent conductive yarns, even when flexed, due to the undulating nature of the weft yarn 102. Thus, the fabric is composed of a plurality of lengths of conductive yarn and a plurality of lengths of insulating 101 yarn, such that each length of conducting yarn is electrically isolated from adjacent lengths of conducting yarn.

As used herein, a yarn should be understood to include a spun thread having many fibres or a continuous fibre, possible extruded from plastic etc. Thus, in this example, each length of the warp yarns is a continuous thread whereas the wefts 102 are spun from a plurality of threads.

Figure 1A:
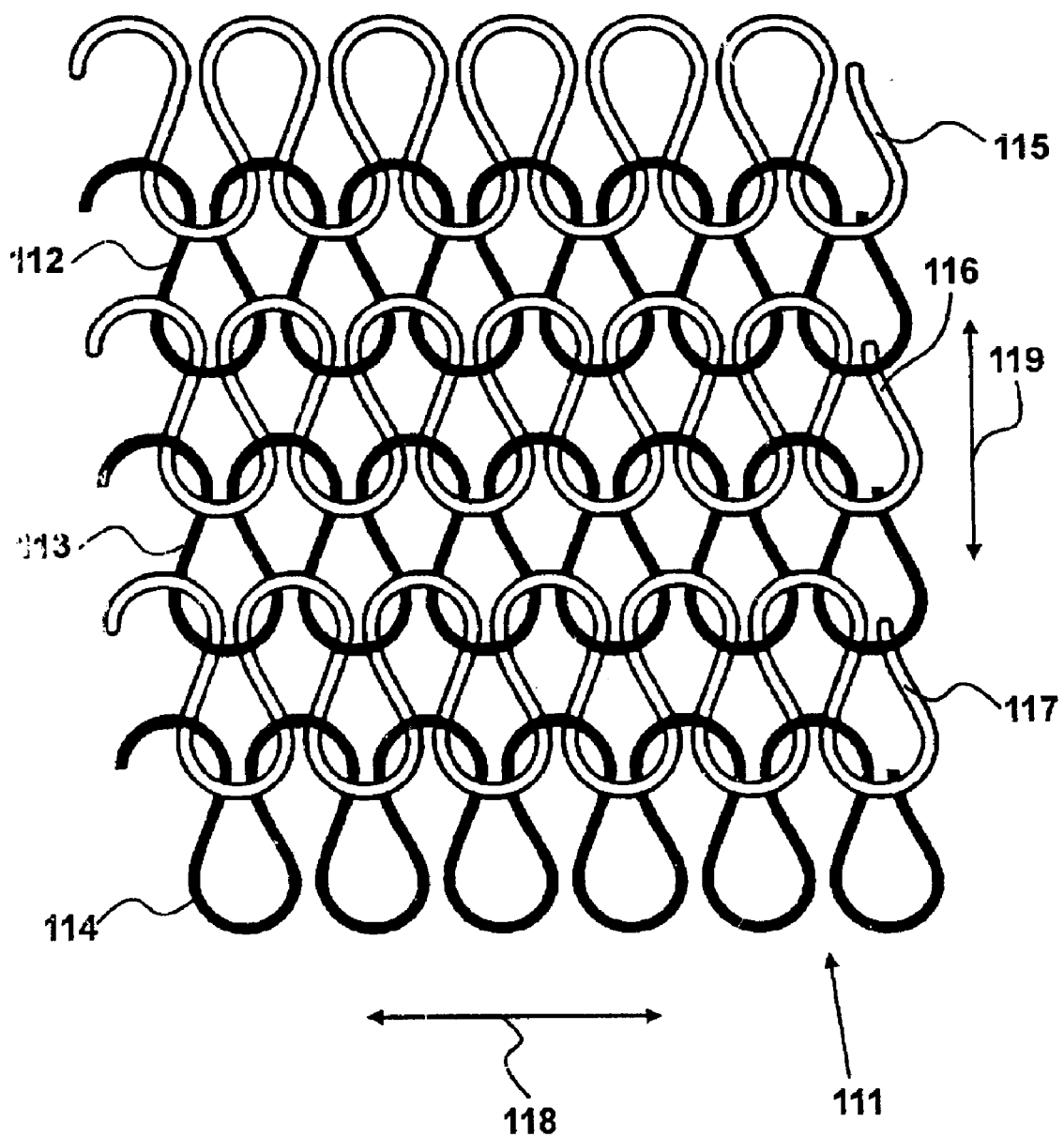
FIG. 1a shows an alternative fabric to that of FIG. 1, fabricated using a knitting process.

An alternative to the fabric of FIG. 1 is shown in FIG. 1A. FIG. 1A provides a detailed view of a fabric 111 produced by a knitting process. Such a construction may be achieved by using either a warp knit or a weft knit process. The knitted fabric 111 is produced by knitting together lengths of conductive yarn 112, 113, 114 and lengths of non-conducting yarn 115, 116, 117 in a machining process. Therefore, in a similar manner to the fabric of FIG. 1, the fabric of FIG. 1a contains lengths of conducting yarn (e.g. 113) that are electrically isolated from adjacent conducting yarn (e.g. 112 and 114) by non-conducting yarn (e.g. 116 and 117).

The knitted fabric thus provides a layer having conductivity in one direction along the layer, indicated by arrow 11B, which is defined by the alternating conductive and non-conductive yarn. The layer is non-conducting in the orthogonal direction indicated by arrow 119.

FIG. 2

Figure 2:
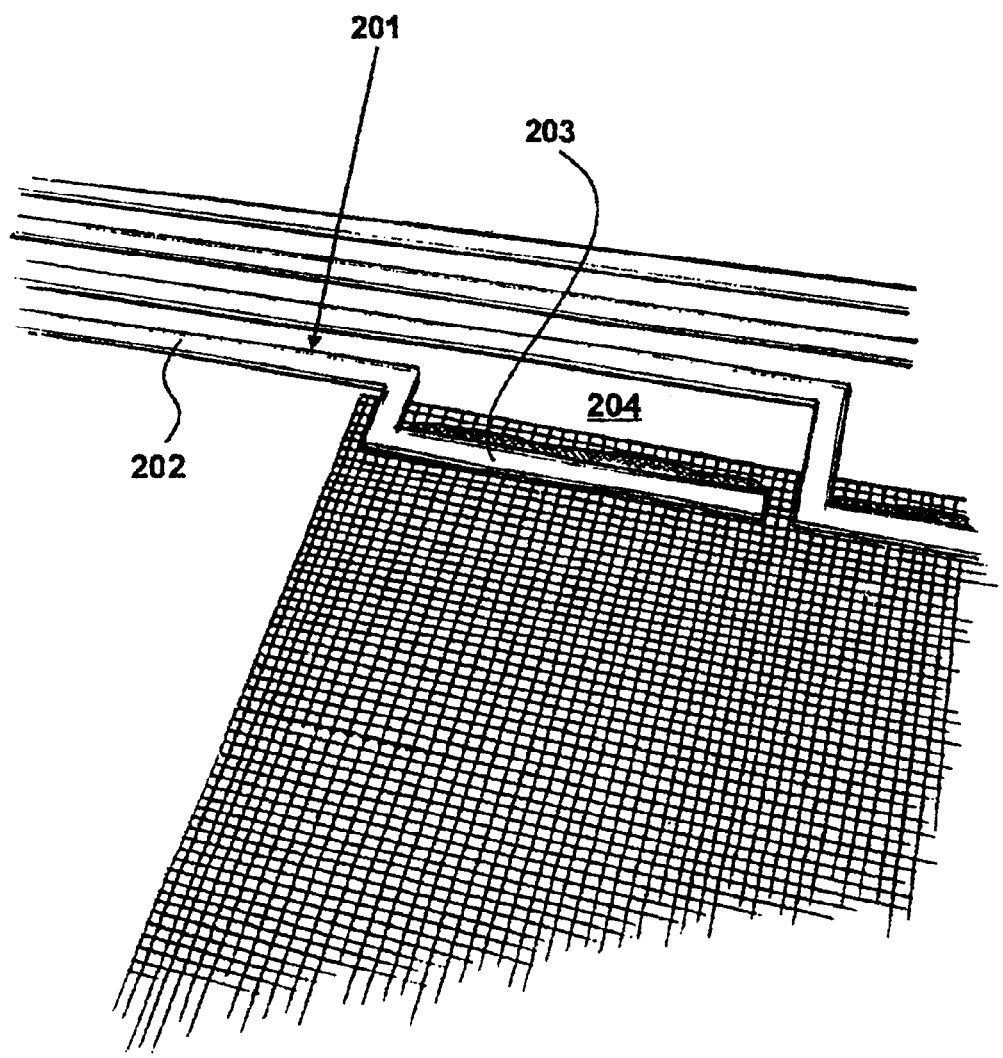
FIG. 2 shows a plurality of warp yarns, of the fabric of FIG. 1 electrically connected to a conductive track.

In the construction of an alpha-numeric keyboard, a plurality of lengths of conductive yarn are selected for electrical connection to a conductive track. Therefore, a plurality of warp yarns, of the fabric of FIG. 1, are electrically connected to a conductive track, as shown in FIG. 2. In the weaving of fabric of the type shown in FIG. 1, the warp threads are not physically grouped and no additional processes need to be performed to the general weaving process. The grouping is only defined by the electrical connection. In the embodiment, all warp threads are electrically connected such that, at a boundary, a warp thread will be connected to a particular electrical connector with the adjacent thread being connected to a different connector; it being noted that adjacent warp threads are electrically insulated from each other by the non-conducting weft threads. However, in an alternative embodiment, non-conductive warp threads could be introduced at group boundaries or gaps may be introduced such that some of the warp threads remain unconnected to an electrical connector. However, advantages in terms of continuity exist if all of the threads are electrically connected, particularly if the device is to be used as a single conductive layer (with the individual connectors being electrically connected together) so as to minimise the introduction of discontinuities.

Conductive track 201 has a conduction portion 202 and an attachment portion 203. The attachment portion 203 makes physical and electrical contact with a set of conducting warp filaments 101. The conduction portion 202 facilitates electrical connection to external devices. The conducting tracks 201 are applied to the conductive material and an insulating substrate 204 by a printing process, using a conductive ink such as that normally used in flexible printed circuit manufacture. Alternatively the conducting tracks may be fabricated from a highly conductive material, possibly fabricated exclusively from conductive filaments, and then attached to the substrate material and the conducting material by means of a conductive adhesive, such as conductive acrylic adhesive containing metallised particles. Alternatively, the conducting tracks may be fabricated from fabric coated with conductive metals, such as silver or nickel. Material of this type is readily available and is used extensively for shielding equipment from electromagnetic interference This too may be used in conjunction with a conductive adhesive.

FIG. 3

Figure 3:
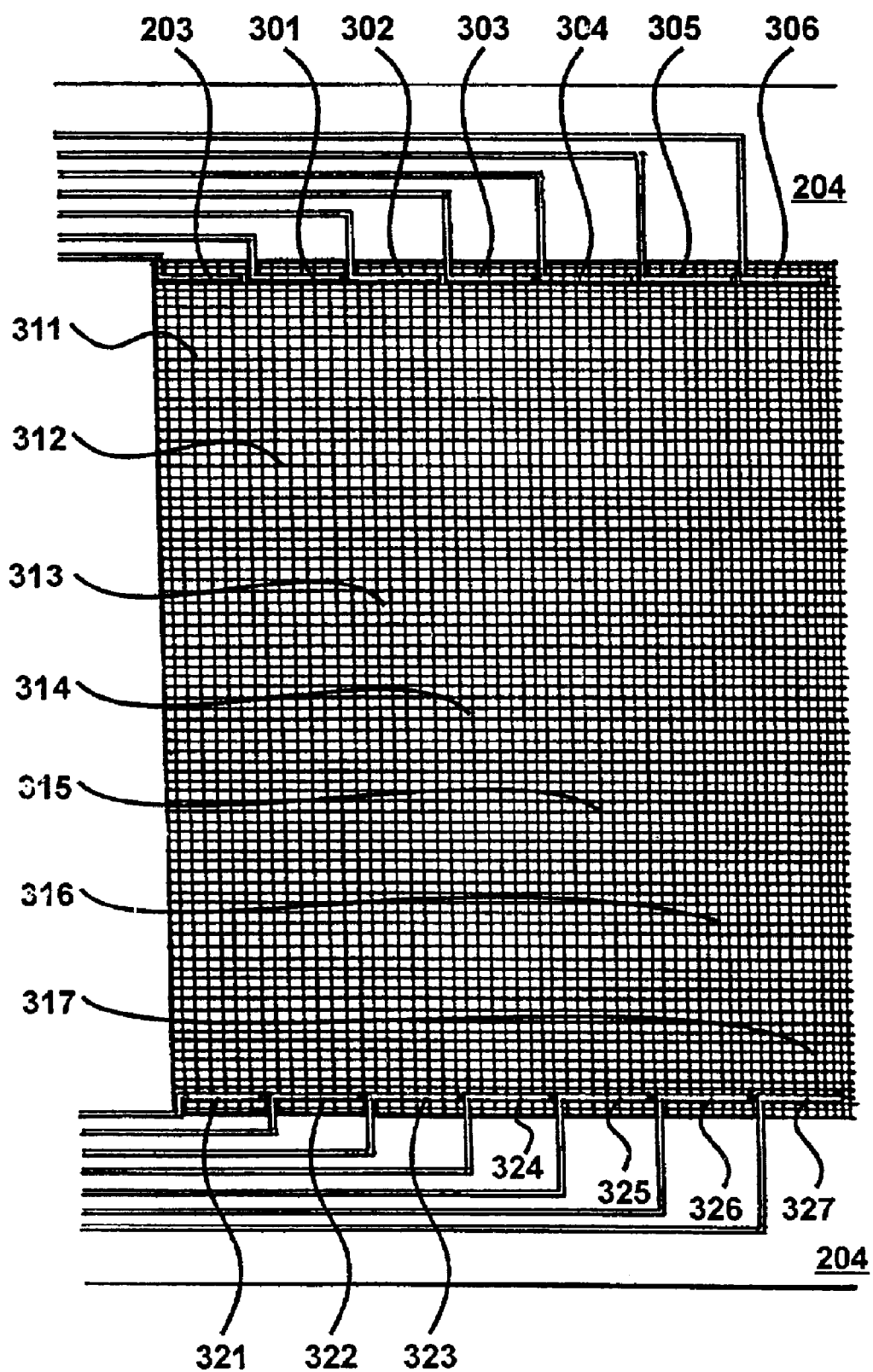
FIG. 3 shows a plurality of conductive tracks of the type shown in FIG. 2 present on a fabricated sheet.

Conductive track 201 represents one of many similar conductive tracks present within a fabricated sheet, of the type illustrated in FIG. 3. FIG. 3 shows the first seven attachment portions 203 and 301 to 306 of sixteen present, each having respective conducting tracks printed or glued to substrate 204. In this way, there is provided sixteen conducting bands corresponding to the attachment portions. For example, the conducting bands 311 to 317 correspond to the first seven attachment portions 203, and 301 to 306. The material has a similar arrangement of attachment portions, e.g. 321 to 327, at its opposite end. Thus, in this way, it is possible for an electrical current to flow through each of the conductive bands e.g. 311, without conduction being made possible between the bands given that the material is not conductive in the orthogonal direction, that is along the direction of the wefts.

FIG. 4

Two fabricated material layers 401 and 402 of the type shown in FIG. 3 form part of the seven layer device of the type shown in FIG. 4. The top conductive layer 401 includes a conductive track assembly 404 having attachment portions making electrical contact along one side of the layer 401, and a second conductive track assembly 405 having attachment portions forming an electrical contact along the opposing edge of the fabric layer 401. The conductive track assemblies 404 and 405 are described in more detail in reference to FIG. 7. The conductive warp fibres of layer 401 extend across the layer from attachment portions of the conductive track 404 to the conductive track 405 thus defining conductive columns across the layer 401.

The bottom conductive layer 402 has a conductive track assembly 406 having attachment portions contacting the fabric layer along one side of the bottom conductive layer 402 and a second conductive track assembly 406a having attachment portions contacting the fabric layer along the opposing side of the bottom conductive layer 402. The conductive threads extend between the attachment portions of conductive tracks 406 and 406a, and are arranged at an angle of ninety degrees to the warp threads of layer 401. Thus, the conductive tracks in top conductive layer 401 present a plurality of conductive columns, with layer 402 presenting a plurality of conducting rows between respective attachment portions.

The seven layer device also includes a central conductive layer 407 and intermediate insulating layers 408 and 409. The central conductive layer 407 is constructed by knitting a polyester yarn of twenty-four decitex filaments having a single conductive filament twisted therein, such that the conductive filament appears relatively randomly in the completed knitted product. In addition, the central conductive layer 407 has a conductance perpendicular to the plane of the device (in the z axis) that increases as it is placed under increasing pressure thereby facilitating conduction between the layers related to the applied pressure during a mechanical interaction.

The insulating layers 408 and 409 are woven or knitted with a relatively wide spacing so as to ensure that the conductive layers are separated while at the same time allowing conduction to take place when mechanical pressure is applied. The presence of these insulating layers ensures that the overall construction may be folded and flexed or wrapped around objects without causing the two conductive layers to be brought into contact and thereby producing an erroneous contact identification.

A top insulating layer 410 is also included in the device. This is a woven layer of insulating fabric onto which a "QWERTY" keyboard outline 411 has been printed on the upper surface along with a rectangle 415 defining a touch pad area. A bottom insulating layer 412, of woven fabric, completes the device. Layer 412 supports an array of key registration devices 413 which are arranged so that each device 413 is aligned with the centre of a QWERTY key outline on layer 410.

In an alternative embodiment, it is possible to fabricate a device using five layers, effectively removing layers 408 and 409. To achieve this, conducting layers 401 and 402, or the central conductive layer 407, are fabricated in a way such that portions of the non-conducting fibres stand proud of the conducting fibres, thereby effectively introducing a degree of insulation in the z direction. This may be achieved by using weft fibres having a larger dimension than the warp fibres or alternatively by introducing other ways of making the weft fibres stand proud.

In a further alternative embodiment, the device is fabricated without any layers between the two layers 401 and 402. In a similar manner to the five layered device, the layers 401 and 402 are fabricated using conducting and non-conducting fibres, such that the non-conducting fibres stand proud of the conducting fibres. The conducting fibres are thus recessed within the layers. The resulting assembly has disadvantages in use, in being more prone to outputting erroneous signals when flexed or folded. This disadvantage is minimised by increasing the depth of the recessing of the conductive fibres in each layer. However, this in turn makes the device harder to activate at low pressures.

The advantage of such an assembly is in its simplicity of construction. In fact such an assembly can be produced in a single pass on a weaving loom in the form known as a "double cloth", where insulating weft and conducting warp form an upper portion of the fabric, and a conducting weft and an insulating warp form a lower half of the fabric. The two portions are periodically attached by the inclusion of one of the insulating yarns from either portion, in the other portion. Insulating substrate material and conducting tracks are then applied onto the outside of the resulting fabric, to complete the assembly.

Conducting tracks, such as track 201, are covered by an insulating adhesive tape or alternatively by a printed insulating material. The layers shown in FIG. 4 are then assembled together, by a sewing operation, or alternatively by lamination, to form an assembled alpha-numeric keyboard.

FIG. 5

Two of the key registration devices shown at 413 of FIG. 4 are shown in the cross-sectional view of FIG. 5. The key registration devices 501 and 502 correspond to the keys for "2" and "Q" respectively. The devices 501 and 502 are mounted onto layer 412 below the upper layers 401, 402, 407, 408, 409 and 410. The registration devices 501 and 502 are dome-like plastic mouldings known as over-centre mouldings. The device 502 is shown in its relaxed position and the layers of fabric above it are not compressed. Whereas, the device 501 is shown deformed under the pressure of a finger 503, and the upper layers of fabric 401, 402, 407, 408, 409 and 410 are compressed between the finger and the device 501. The compression of the upper layers allows current to flow from layer 401 to layer 402 at that location.

Under the pressure exerted by a finger the device 501 deforms inwardly until at a certain position its resistance to deformation becomes suddenly reduced and it pops down. On release of pressure it will pop back up to its relaxed position.

The devices such as 501 serve the purpose of establishing an accurate position for the compression of the fabric. This provides for reduced ambiguity as to which key press is intended by the user. In addition, the deformation of the over centre provides the user with tactile feedback in two ways. Firstly, the user identifies the bump produced by the over centre as the correct location of a key. Secondly, the user feels the deformation of the over centre under the finger and is satisfied that the key has been pressed sufficiently firmly.

In an alternative embodiment, all key registration devices are solid plastic or silicone rubber bumps 510 mounted on layer 412 as shown in FIG. 5a. Therefore, the devices serve the purposes of establishing an accurate position for the compression of the fabric and provide the user with tactile feedback with regard to the location of the key. Alternatively bumps 510 are mounted on the underside of top insulating layer 410, thus negating the need for layer 412.

In a further alternative embodiment, the key registration devices are solid bumps 511 of plastic or silicone rubber of a reduced size as shown in FIG. 5b, such that the user does not feel them but they still provide a means of ensuring accurate positioning of compression of fabric at a key.

In another alternative embodiment the key registration devices are mounted on the uppermost conductive layer 402, as illustrated in FIGS. 5C and 5D. FIGS. 5C and 5D show cross-sectional views through an alternative key registration device 521, which forms part of an array of key registration devices in a key board. In this embodiment the construction of the alpha-numeric keyboard is similar to that previously described with reference to FIG. 4 except that the key registration devices are mounted on the upper surface of conductive layer 402 below the outer insulating layer 410, and the key registration devices themselves have an additional feature to those illustrated in FIG. 5, in the form of a bump 522.

Thus the key registration devices, such as device 521, are dome-like plastic mouldings known as over-centres, which have an integral bump located centrally on their underside. The over-centre 521 is shown in FIG. 5D at the start of a press by finger 523. The force applied by the finger 523 is transferred to the fabric layers 402, 408, 407, 409, 401, 412 at the circular base 524 of the overcentre. However, due to the relatively large area of the circular base 524, the pressure compressing the fabric sheets 402, 408, 407, 409, 401, 412 is relatively small and there is not yet any electrical contact between the conducting layers 402, 407 and 401.

As the over-centre 521 is pressed down further the over-centre deforms until at a certain position it flips down to a second configuration as shown in FIG. 5D. As in the case of FIG. 5C, relatively little pressure is exerted onto the sheets 402, 408, 407, 409, 401, 412 below the circular base 524 of the over-centre device 521. However, the bump 522 acts on a relatively small area of the sheets 402, 408, 407, 409, 401, 412 and as a result it applies a relatively large pressure and produces a significant compression of said sheets. By this means the conductive sheets 402, 407 and 401 are brought into electrical contact at a single location 525.

Thus, using the over-centre device 521, the user of the alpha-numeric keyboard is provided with the two types of tactile feedback, as described with reference to FIG. 5, while at the same time the bump 522 ensures that the electrical contact between conductive layers is focused on a single location determined by the positioning of the over-centre.

Using any of the above key registration devices provides an accurate and reliable positioning of compression of fabric at a key. Therefore, using these registration devices allows smaller key outlines to be used, without the user requiring a stylus to ensure accuracy of key depression. It should be noted that the key registration devices are thus locatable above or below the five fabric sensing layers 401, 409, 407, 408 and 402 and may be positioned within the outer fabric layers 410 and 412, as has been described, or alternatively they could be mounted outside of these layers, i.e. on the outside of all of the fabric layers.

The key registration devices described above, take the form of individual devices which are adhered to a fabric layer by a suitable adhesive. By using individual key registration devices with spaces between allows the complete alpha-numeric keyboard to be easily folded or similarly deformed. However, where flexing, folding etc. of the keyboard around tight radii is not an issue, a continuous flexible sheet containing all key registration devices of the alphanumeric keyboard could be used instead.

FIG. 6

A portion of the alpha-numeric keyboard, demonstrating the registration of the key registration devices, the printed keyboard outline and the conductive bands of layers 401 and 402 (shown in more detail in reference to FIG. 7), is shown in FIG. 6. The five conductive rows 601 to 605 of layer 402 and three of the conductive columns 606 to 608 of layer 401 are shown in FIG. 6. Each intersection of a row and a column defines a separate region of the alpha-numeric keyboard, and each region corresponds to one of the QWERTY keys printed onto the top layer 410. For example, a key outline 609, corresponding to the key labelled "2", corresponds to the intersection of row 601 and column 606, and key outline 610, corresponding to the key labelled "R", corresponds to the intersection of row 602 and column 608.

Each key outline is arranged to be symmetrically positioned above a key registration device on layer 412. For example, key outline 609 is positioned symmetrically above key registration device 501.

As shown in FIG. 6, the key outlines are arranged in a staggered manner, such that for the alpha-numeric keys, the centre of a key on one row is aligned with the gap between the keys on the row below. For example, key outline 609, is located such that its centre is aligned with the gap between key outlines 612 and 613. Therefore, the key outlines do not correspond exactly with the conductive band intersections. However, the key registration device for a particular key is located within the area defined by the key outline and the area defined by the corresponding conductive band intersection. Therefore, when a user presses a key, for example 609, because the key registration device (in this case 501) is located within the corresponding intersection of bands, (in this case bands 601 and 606) the conducting layers 401 and 402 are electrically connected at the correct intersection.

FIG. 6 also shows key outline 614 and part of outline 615 corresponding to the "Alt" key and "spacebar" respectively. Since they are keys of extended length, the respective key registration devices 616 and 617 are extended in a corresponding manner. Unlike devices 501 and 502, the key registration devices 616 and 617 are elongated with thicker cross-section side walls providing the tactile feedback function.

FIGS. 7A and 7B

The conductive layers 401 and 402 of FIG. 4 are shown separately in plan view in FIGS. 7A and 7B respectively. FIG. 7A shows layer 401 with conductive track assembly 404 having fifteen short attachment portions 701 to 715 attached along one edge of the fabric layer and conductive track assembly 405 having fifteen corresponding portions 701a to 715a attached along the opposing edge of the fabric layer 401, effectively defining fifteen narrow conductive columns, for example columns 606, 607, 608. In addition, the two longer attachment portions 721 of conductive track assembly 404 and 722 of conductive track assembly 405 define a wider conductive column 716. Accordingly, the layer 401 is effectively divided into a total of sixteen conductive columns, fifteen narrow columns and one wide column.

FIG. 7B shows the five attachment portions 731 to 735 and 741 to 745 along opposing short sides of layer 402, effectively defining the five parallel conductive rows, 601 to 605. The conductive fibres of each fabric layer 401 and 402 extend perpendicular to the attachment portions as previously described in reference to FIGS. 2 and 3. Therefore, in this way, the device is effectively divided into eighty (equal to 5×16) specific regions, each region is identifiable within the device as being in a particular column in sheet 401 and in a particular row in sheet 402. Furthermore, a mechanical interaction, corresponding to a key press, may result in a current flow within a particular area between conductive layers 401 and 402.

FIG. 8

An assembled alpha-numeric keyboard 801, assembled from the layers shown in FIG. 4, is shown in FIG. 8. Wires are attached to the ends of the conductive tracks of conductive track assemblies 404, 405, 406 and 406a and then assembled together in the form of a cable 802 connecting the fabric device 801 to an interface device 803.

Physically, the alpha-numeric keyboard 801 appears to be a continuous sheet, without discontinuities. However, given the arrangement of electrical connectors, the sheet is effectively divided into a plurality of regions, a total of eighty in this example but the actual number present in any implementation is determined by the ultimate function that the alpha-numeric keyboard is to perform.

The device 801 is constructed from textile fabrics and as such it may be folded, flexed or wrapped around an object.

The QWERTY keyboard outline 411 is shown in FIG. 8 to the left of the touch pad area 415. In use the keyboard and interface circuit respond in a similar manner to a conventional computer keyboard, providing an output indicative of which key or keys have been pressed. The touch pad is able to detect the X and Y position of a mechanical interaction on its surface and also the pressure applied by the mechanical interaction. Therefore, when the touch pad is touched by the user, they may, for example, manoeuvre a screen cursor by dragging their finger across the surface of the touch pad, and then provide further information to the computer by pressing harder onto the touch pad. Therefore, the user may use the alpha-numeric keyboard of the present invention in place of the usual keyboard and in place of or in addition to a mouse or touch tablet or similar devices for inputting data into a computer or similar electronic device.

In order to enable the detection of a mechanical interaction and/or the pressure and location of that mechanical interaction within an area of the keyboard, the interface circuit 803 is configured to operate in different modes capable of providing the required outputs.

In mode one operation, the interface circuit provides an output indicating whether a mechanical interaction has occurred in a given area of the keyboard selected by the interface device. In mode two operation, the circuit produces an output that provides a quantitative measure of the pressure and/or area of the mechanical interaction within an area of the keyboard selected by the interface circuit. In mode three operation, the circuit can provide an output corresponding to the pressure of the mechanical interaction and the X and Y positional co-ordinates at which the mechanical interaction occurred within a selected area (such as the touch pad area 415 of the fabric keyboard). In a fourth mode of operation, all inputs into the keyboard are selected in groups in a manner to be described later, and the position and pressure of a mechanical interaction may be determined anywhere over the keyboard surface. To detect a key press on the keyboard, mode one or two operation is preferable. To detect the position of a mechanical interaction on a touch pad sensor, mode three or four operation is required with mode three (i.e. detecting the position and pressure within the touch pad area) being the most preferable in the embodiment of the keyboard shown in FIG. 8.

FIG. 9

Interface circuit 803 is detailed in FIG. 9. The interface device includes a detection processor 901, a pressure/location detection circuit 902, a switching circuit 903, a multiplex switch 904 having electrical connection inputs elements 905, an input socket 906 and an output socket 907 provided to allow connection to a computer. The computer may be, for example, a laptop, a PDA (personal digital assistant), or personal computer. Alternatively, the computer may be replaced by a mobile phone. Each of the five conductive rows in layer 402, the fifteen narrow conductive columns in layer 401 and the wide column in layer 401 corresponding to the touch pad area, have two associated wires. Therefore in this embodiment with eighty regions, there is a total of forty two individual wires restrained within cable 802. These wires are received by input connector 906 and are then fed individually to the inputs elements 905 of multiplex switching circuit 904. It must be noted that in modes one or two no connections to 701a and 715a along one edge of the keyboard are required and the number of electrical connections may therefore be twenty seven).

The interface circuit 803 must identify a press on the alpha-numeric keyboard as being a key press in the QWERTY keyboard area or a press on the touch pad. If the QWERTY keyboard area is pressed, then the interface circuit provides an output identifying the location (identified by the multiplex scan of the regions) of the one or two keys which have been pressed (mode one or two operation). If the touch pad area is touched then the interface circuit provides an output indicating the location of the press and the pressure applied (mode three operation).

In the initial state, the multiplex switch 904, under the control of detection processor 901, connects the pressure/location detection circuit 902 to all five attachment portions 731 to 735 and a second connection to all five attachment portions 741 to 745 of layer 402. A further connection is made to all sixteen attachment portions 701 to 715 and 721 on layer 401 with a final connection made to all sixteen attachment portions 701a to 715a and 722 on the opposite side of layer 401. A total of four connections to the pressure location detection circuit 902 are made. If, on viewing these terminals in a form described later as a z-axis measurement, an open circuit is present, no mechanical interaction has occurred on the alpha-numeric keyboard. Alternatively, if a dosed circuit is identified, this indicates the presence of a mechanical interaction and an output to this effect is supplied to switching circuit 903 which in turn conveys this information to the detection processor 901 and to output socket 907. This process is detailed further in relation to FIG. 12.

A mechanical interaction could indicate one or more simultaneous key presses on the QWERTY keyboard outline 411 or a press on the touch pad area 415.

On detection of a mechanical interaction, the multiplex switch 904 under the control of detection processor 901, maintains the connections of the pressure/location detection circuit 902 to layer 402, and two connections are made from the pressure/location detection circuit 902 to the leftmost eight of the attachment portions 701 to 708 on one side of layer 401 and 701a to 708a on the opposite side of layer 401. Again the pressure/location detection circuit 902 detects the presence of a closed or open circuit; a closed circuit indicating one or more key presses in the leftmost half of the alpha-numeric keyboard. An output indicative of an open or closed circuit is supplied to the switching circuit 903 which in turn conveys this information to the detection processor 901 and to output socket 907.

The multiplex switching circuit is then commanded by the detection processor to disconnect the connection to the eight leftmost attachment portions of layer 401 and make connections from the pressure/location detection circuit 902 to the remaining seven short attachment portions 709 to 715 and 709a to 715a respectively. Again an open or closed circuit is detected and the information relayed to the detection circuit 901. A closed circuit at this stage indicates one or more key presses in the rightmost half of the QWERTY keyboard outline.

In an alternative embodiment of the present invention, the multiplex switch 904, under the control of detection processor 901, makes a single connection between the pressure/location detection circuit 902 to all five attachment portions 731 to 735 with all five attachment portions 741 to 745 remaining unconnected. A second connection is made to all sixteen attachment portions 701 to 715 and 721 on layer 401 with all sixteen attachment portions 701a to 715b and 722 on the opposite side of layer 401 remaining disconnected. Accordingly, only two connections to the pressure/location detection circuit 902 are made. If, on viewing these terminals, an open circuit is present, no mechanical interaction has occurred on the alpha-numeric keyboard. Alternatively, if a closed circuit is identified, this indicates the presence of a mechanical interaction and an output to this effect is supplied to switching circuit 903 which in turn conveys this information to the detection processor 901 and to output socket 907. In this example, the circuit is acting in mode one, and only a contact, or the absence of a contact is required to be indicated.

In the preferred embodiment, if no key presses are detected, therefore implying that the touch pad has been pressed, the detection processor provides an output to this effect to the output socket 907 via switching circuit 903. The detection circuit also commands the multiplex switch 904 to make a connection of the pressure/detection location circuit 902 to attachment portion 721, a second connection to portion 722, a third connection to the five attachment portions 731 to 735 and a fourth connection to the five portions 741 to 745. The pressure/location detection circuit detects pressure applied to the touch pad area 415 by a mechanical interaction such as a finger press and also the X and Y position of the mechanical interaction (mode three operation). Corresponding pressure and positional values are supplied by the pressure/location detection circuit (as described later in reference to FIGS. 15 to 17) to the switching circuit and so to the detection processor 901 and to the output socket 907.

The connections to the pressure/location detection circuit 902 are maintained by the detection processor while the pressure location detection circuit provides an output indicative of a mechanical interaction. When a mechanical interaction is no longer indicated, the detection processor returns the multiplex switch back into the initial state.

Alternatively, if one or more key presses are detected relating to either the eight leftmost attachment portions 701 to 708 and 701a and 708a or the remaining short attachment portions 709 to 715 and 709a and 715a, then the detection processor 901 performs a binary search to identify the conducting row and column intersection at which a mechanical interaction is present. The circuit does this by a process of elimination. For example, if a key press is not detected in the columns relating to attachment portions 709 to 715 and 709a to 715a then no further search is necessary in respect of these columns. But, if a key press is detected in the eight leftmost conducting columns relating to attachment portions 701 to 708 and 701a to 708a, the multiplex switch 904 under the control of detection processor 901 makes connections from pressure/location detection circuit 902 to the first four attachment portions 701 to 704 and 701a to 704a of layer 401 and a further connection to the five attachment portions 731 to 735 and 741 to 745 on each side of layer 402. Pressure/location detection circuit 902 detects the presence of an open or closed circuit and provides an indicative output to detection processor 901. The multiplex switch 904, then makes a connection from pressure/location detection circuit 902 to the next four attachment portion 705 to 708 and 705a to 708a of layer 401 while maintaining the connections to the five attachment portions 731 to 735 and 741 to 745 of layer 402. The pressure/location detection circuit 902 detects the presence of an open or closed circuit and provides an indicative output to detection processor 901.

Thus, the control circuit identifies if just one or both of the two groups of four columns is subject to a key press. If just one of the two groups is identified as relating to a key press, then this group only is interrogated and the other group is eliminated from further search. But if both groups are identified as relating to a key press, then both groups will need to be interrogated further.

The process of binary search is continued in this manner until the identity of the individual columns relating to the key press or presses is established. A similar process is then followed to establish which of the rows contains the key press or presses. This is done by making connection of the location detection device to all sixteen attachment portions on both sides of layer 401 and a second connection to a varying number of the attachment portions 731 to 735 on layer 402. Having established both the row and the column, the detection processor 901 then provides an output indicating the location(s) to output socket 907 via the switching circuit 903. The detection processor then resets the multiplex switching circuit to its initial state in readiness for the next mechanical interaction to be detected.

FIG. 10

The pressure/location detection circuit 902 is detailed in FIG. 10. The location detection circuit comprises a peripheral interface controller 1001 which is connected to a serial communication output 1002 and electrical connections 1003, 1004, 1005 and 1006 configured to supply and receive the necessary voltages via the multiplex switch 904.

The peripheral interface controller (PIC) 1001 is a programmable controller of the type PIC16C711. The PIC 1001 operates under the control of a programmed which controls the parameters of the detector which the pressure/location circuit 902 is configured to measure or detect. Parameters under investigation will depend upon which mode of operation and will be discussed further in reference to FIGS. 11 to 17.

Under control of the PIC 1001, and dependant on the mode of operation, the necessary output voltages can be supplied to electrical connections 1003, 1004, 1005 and 1006 via pins one, two, ten, eleven, twelve and thirteen of the PIC. The PIC includes an analogue to digital converter which is used to process analogue voltages received at pins seventeen and eighteen. The input pins seventeen and eighteen receive outputs from high impedance buffers 1009 and 1010 respectively. The buffers 1009 and 1010 are half of unity gain operational amplifiers of the type TL062, and provide a high impedance buffer between the sensor output voltages and the PIC 1001 input ports.

Connection to pins one and two occurs via resistors 1008 and 1007 respectively. Resistors 1008 and 1007 are selected according to the resistance of the detector as measured from a connector attached to one fabric layer 401 to a connector attached to the second fabric layer 402 while a typical mechanical interaction pressure is applied to the corresponding area of the detector under investigation. A value of 10 Kohms is typical for resistors 1008 and 1007.

The PIC 1001 has an external crystal oscillator (not shown) running at 4 MHz connected across pins fifteen and sixteen. Positive five volts is supplied to pin fourteen and ground is connected to pin five. Pin four (the internal reset input) is held at positive five volts via a series resistor of 100 ohms.

The program running on the PIC 1001 will determine the operational mode of the interface device 803 and determine the output measured by pressure/location detection circuit 902 within a region of the keyboard selected by the multiplex switch 904.

The interface device 803 can function to provide outputs indicative of a mechanical interaction and to provide positional information about the location the mechanical interaction when, for example, the touch pad detection area is pressed. A mechanical interaction results in the initiation of current flow from the first electrically conductive layer 401 to the second electrically conductive layer 402. Accordingly, the pressure/location detection circuit 902 is configured to detect the current flow and perform electrical measurements to determine properties of the interaction such as pressure and, in mode three operation, the position of the interaction occurring within a selected area.

FIGS. 11A and 11B

A procedure for determining the pressure and/or area of a mechanical interaction is detailed in FIGS. 11A and 11B. An area of the conductive fabric layers 401 and 402 to which voltages are being supplied via multiplexing switch 904 are represented schematically by potentiometers 1101 and 1102 and the resistance of the conductive path between the outer layers at the location of the applied force is represented by variable resistor 803.

A first measurement of a characteristic of a mechanical interaction such as pressure is shown in FIG. 11A. Five volts are applied to connector 1006, while connector 1005 remains disconnected. Connector 1003 is connected to ground via a resistor 1007 of known value. Thus current flows from connector 1006 through a first part of layer 402 as represented by a first part 1104 of the potentiometer 1102, through the conductive path indicated by variable resistor 1103 having resistance Rv, through a first part of layer 401, indicated by a first part 1105 of potentiometer 1101 and through the known resistor 1007. The voltage, V1 appearing at connector 1003 is measured and since this is equal to the voltage drop across resistor 1007, V1 is directly proportional to the current flowing from connector 1006.

A second measurement of Rv can be performed as shown in FIG. 11B. Five volts are applied to connector 1004, while connector 1003 is disconnected. Connector 1005 is connected to ground via a resistor 1008 of known resistance. The voltage V2, dropped across resistor 1008 is measured. Voltage V2 is directly proportional to the current flowing through a second part of layer 401 indicated by a second part 1106 of potentiometer 1101, through the conductive path indicated by variable resistor 1103 having resistance Rv, through a second part of layer 402 indicated by a second part 1107 of potentiometer 1102 and through resistor 1008. It should be noted that in mode one operation, where only an indication of a contact is required, only a first measurement (as indicated in FIG. 11A) is required. Although less precise, a single measurement will provide an indication of the pressure applied that is sufficient for many applications (although a negligible position related error may occur). Hence, for the detection of key press on a keyboard a single pressure measurement would suffice.

For modes two, three and four, the sum of the resistance of first part 1105 and second part 1106 of potentiometer 1101 is approximately equal to the resistance between connector 1004 and 1003 on layer 401, and is therefore substantially constant during the measurements, since they occur in rapid succession. Similarly the sum of the resistance of first part 1104 and second part 1107 of potentiometer 802 is approximately equal to the resistance between connector 1006 and 1007 on layer 402, and is also substantially constant during the measurements. As a result, the relationship 1110 exists between the resistance Rv, of the conductive path between the outer layers, and the measured voltages V1 and V2, i.e. the resistance Rv between the outer layers is proportional to the sum of the reciprocal of voltage V1 and the reciprocal of voltage V2. For modes two, three and four, the voltages are used to calculate a Z value which is indicative of the pressure applied in the Z axis to the fabric planes. Depending upon the type of sensor used the resistance Rv depends upon area of the applied pressure or a function of the area and the force as illustrated by relationship 811. Thus from the voltage measurements V1 and V2 an indication of the pressure with which the mechanical interaction is applied, or an indication of the area and the applied force may be determined.

FIG. 12

An example of the program running on the PIC 1001 of the pressure/location circuit 902 during mode one and two operation (where the circuit only produces an output in response to the pressure of a mechanical interaction) is detailed in FIG. 12. At step 1201 the hardware is initialised and this process is detailed later in reference to FIG. 13. At step 1202 the pressure/location detection circuit 902 measures values of voltages V1 and V2 (as described in reference to FIG. 11) and calculates a Z value of the interaction. The details of step 1202 are described later with reference to FIG. 14. At step 1203 a question is asked as to whether the Z data is greater than a predetermined value. If the answer to this question is no then the program returns to step 1202. Thus the circuit measures Z values until a Z value greater than a predetermined value is detected. If the answer to the question at step 1203 is yes then, in mode one operation, an output is produced that is indicative of a mechanical interaction at step 1204. In mode two operation, the circuit measures the necessary voltages and calculates a Z value at step 1204 and provides a quantitative output indicating the magnitude of the applied pressure.

Once an output has been provided, the program then returns to step 1202 and looks for an indication of a further mechanical interaction. For example, in mode two operation, the multiplexing switch 904 under the control of detection processor 901 will configure the connections made to the detector so that a further area of the detector is subsequently selected and the pressure/location detection circuit 902 will monitor that further area for an indication of a mechanical interaction.

FIG. 13

Step 1201 of FIG. 12 is shown in further detail in FIG. 13. Within the initialisation step 1201, at step 1301 the interrupts are cleared and then at step 1302 pins seventeen and eighteen are set up as analogue to digital converter inputs. The microports of a PIC16C711 may be configured as low impedance outputs or high impedance inputs. When in high impedance input mode, pins seventeen and eighteen can be programmed to connect via an internal multiplexer, to the analogue to digital converter. At step 1303 the ports which are to be used as inputs or outputs are configured in their initial state. At step 1304 all system variables are cleared and all interrupts are disabled.

FIG. 14

Step 1202 of FIG. 12 is shown in further detail in FIG. 14. Within step 1202, at step 1401, the ports corresponding to pins two and ten are reconfigured as output ports and at step 1402 pin two is set to zero while pin ten is set to positive five volts. Thus connector 1003 is grounded via resistor 1007 and five volts are applied to connector 1006. At step 1403 a time delay, (typically of 200 microseconds in a sensor measuring 240 millimeters by 90 millimeters with an outer layer resistance of 3.5 Kohms) is provided to allow voltages to settle before the voltage at pin seventeen is measured and stored as detailed in step 1404. Thus voltage V1 present at connector 1003 is measured and stored.

At step 1405 pins two and ten are reconfigured as high impedance inputs while pins one and twelve are reconfigured as low impedance outputs.

At step 1406 the voltages the voltages on pins one and twelve are set to zero and positive five volts respectively. Thus connector 1005 is grounded via resistor 1008 while five volts are supplied to connector 1004. A suitable time delay, equivalent to that at step 1403, is provided at step 1407 before the voltage at pin eighteen is measured and stored at step 1408. Thus the voltage present on connector 1005 is measured and stored as voltage V2. At step 1409 a Z value is calculated from stored voltages V1 and V2, and then stored. The pins one and twelve are reconfigured back to their initial state of high impedance inputs at step 1410.

During mode three operation, the circuit is configured to detect whether a mechanical interaction has occurred within a region and to provide a calculation as to the position of the mechanical interaction (i.e. the x and y positional co-ordinates of an interaction) within an area of the keyboard under investigation (such as the touch pad), in addition to calculating a further property of the mechanical interaction, such as pressure and/or area. Similarly, in mode four operation all the connections within each conductive track assembly (i.e. 404, 405, 406 and 406a) of the fabric planes 401 and 402 are connected so that the detector operates as a single pressure sensitive sheet with four single connections attached thereto. The x and y co-ordinates of a mechanical interaction on the detector are determined by the pressure/location detection circuit 902 in addition to determining a Z co-ordinate value as necessitated by mode two operation.

FIGS. 15A and 15B

A procedure for measuring pressure and/or area of a mechanical interaction (or Z axis data), is described in reference to FIGS. 11A and 11B. A procedure for determining the position of a mechanical interaction within an area of the detector under investigation is illustrated in FIGS. 15A and 15B.

FIG. 15A details the application of a voltage to an area of fabric layer 401 which is represented as potentiometer 1101. The corresponding area of fabric sheet 402 selected to detect an output voltage or have a voltage applied thereto is represented by potentiometer 1102. A first position measurement is made by applying a voltage of five volts to connector 1005 whilst connector 1006 is grounded. As a result a potential gradient is produced across layer 1102. A voltage measurement is made at connector 1003 using a high impedance device and so the voltage appearing on layer 1102 at the position of the applied force 1501 is determined. This voltage, V3 is directly proportional to the distance of the centre of the applied force from the electrical contact 1006 and indicates its x axis position.

A further measurement is shown in FIG. 15B. Five volts are applied to connector 1003 and connector 1004 is grounded. A voltage measurement is made of voltage V4 appearing at connector 1005. Voltage V4 is directly proportional to the distance of the centre of the applied force from the electrical contact connected to voltage input 1004 and indicates its Y axis position shown at 1502. Therefore voltage V3 and V4 provide information as to the two dimensional position of the applied force on the sensor within the area of fabric sheets 401 and 402 under investigation, i.e. voltages V3 and V4 represent X and Y values for the centre of the position of the applied force.

FIG. 16

An example of a program that runs on the PIC 701 to determine the location and pressure of a mechanical interaction (mode three and four operation) is shown in FIG. 16. Steps 1201, 1202 and 1203 have already been described in reference to FIGS. 12, 13 and 14 as these steps are common to all four operational modes of the interface device 803. Accordingly, the PIC is programmed to collect Z data (step 1202) and to determine whether the collected Z data is greater than the pre-set lowest acceptable threshold value (step 1203). In mode three operation, if the answer to the question at step 1203 is yes then the circuit measures voltages V1,V2, V3 and V4 (as described in reference to FIGS. 11 and 15) at step 1601. Step 1601 is described later in more detail with reference to FIG. 17. At step 1602 a question is asked as to whether the calculated Z value is still above the predetermined value. If the question is answered in the affirmative, a further question is asked at step 1603 as to whether enough samples have been obtained. Typically, between three and ten sets of samples are taken, with lower numbers of sets of samples being taken when a fast response time is required. If the answer to the question at step 1603 is no, then the program returns to step 1602 and a further set of measurements are made. When the answer to the question at step 1603 is yes, or when the answer to the question at step 1602 is no, then the program calculates average values of the samples of the voltages V3 and V4, and of the values of Z which have been collected. Thus, the program measures a predetermined number of voltages before finding the average values, or if the Z value drops below a predetermined value, the average values are calculated immediately. By using the average of a number of samples the effect of mains power electromagnetic interference or other such environmental noise may be minimised.

A simple calculation to find an 'average' value for say the X value, is to find the median of the maximum and minimum values of the stored values V3, i.e. a 'smoothed' value for X is found by adding the maximum stored value of V3 to the minimum stored value of V3 and dividing the result by two.

To further improve accuracy, values of X, Y, and Z that differ by a large amount from their immediately preceding and immediately subsequent values are excluded from the calculations of the average. In addition, known methods of eliminating mains electricity supply interference may be applied to the signals received from the sensor.

At step 1605 the averaged values for V3 and V4 representing XY positional co-ordinates and the averaged values of the Z data are output at the serial communication output 1002. The program then returns to step 1202 and looks for an indication of further mechanical interactions.

FIG. 17

Step 1601 of FIG. 16 is shown in further detail in FIG. 17. Within step 1601, at step 1701 a Z value is collected in the same manner as at step 1202. At step 1702 pins one and two are reconfigured as high impedance inputs and pins ten and eleven as low impedance outputs. At step 1703 pin ten is set to zero volts and pin eleven is set to positive five volts. Thus five volts are supplied to connector 1005 while connector 1006 is grounded. A delay is then provided at step 1704, (of typically 200 microseconds for a device measuring 240 mm by 90 mm) to allow voltages in the sensor to settle before the voltage on pin seventeen is measured at step 1705. Therefore a voltage V3 present on connector 1003 is measured which provides an indication of the X position of the applied force.

Pins ten and eleven are then reconfigured as high impedance inputs and pins twelve and thirteen are reconfigured as low impedance outputs at step 1706. The voltage on pin twelve is then set to zero while the voltage on pin thirteen is set to five volts at step 1707. Thus five volts are supplied to connector 1003 while connector 1004 is grounded. A time delay is provided at step 1708, similar to that at step 1704, before the voltage appearing at pin eighteen is measured at step 1709. Thus a voltage V4 present on connector 1005 is measured which provides an indication of the Y position of the applied force. Pins twelve and thirteen are then reconfigured back to their initial state of high impedance inputs.

Therefore by the method described with reference to FIGS. 11 to 17, in mode three and mode four operation, the pressure/location detection circuit 902 is able to make voltage measurements V3 and V4 which provide an indication of the X and Y co-ordinate position of the force applied to a fabric sensor, and measure voltages V1 and V2 which are proportional to currents passing through the sensor and provide information as to a second characteristic of the applied force. The second characteristic may be the pressure with which the force is applied or a combination of the size of the force and the area. Furthermore, the pressure/location detection circuit 902 combines the voltages V1 and V2 to determine a Z value representative of the second characteristic.

Consequently, in both mode three and mode four operation, the pressure/location detection circuit 902 provides output data representative of X and Y position of the applied force and the Z value. However, in an alternative embodiment the pressure/location detection circuit 902 provides output data corresponding to the measured voltages V1, V2, V3 and V4.

FIG. 18

An alternative alpha-numeric keyboard 1801, for use with a computer or similar electronic device, is shown in FIG. 18. Unlike the device shown in FIG. 8, the device 1801 does not have an area marked on its surface for use as a touch pad. Instead, it has a has a QWERTY keyboard outline 411 and a button outline 1802 printed onto its top insulating layer 1805. The alpha-numeric keyboard may be used as a keyboard and, when the area defined by the button outline 1802 is pressed, the whole area of the keyboard outline may be used as a touch pad. A second press on the area within the button outline returns the alpha-numeric keyboard to its keyboard mode of operation.

Alternatively, the alpha-numeric keyboard does not have a "button" for changing the mode of operation between keyboard mode and touch pad mode. Instead, the device relies on software resident in the computer to recognise a distinctive movement of pressure traced out over its surface. That is, it recognises a gesture made by the user. Such gesture recognition is known, for example, in present palm computers.

The device 1801 contains conductive fabric layers and these are electrically connected to an interface circuit 1803 by means of a cable 1804. The interface circuit 1803 has an output socket (not shown) suitable for connection to a computer or similar device.

FIG. 19

The layered structure of the device 1801 is shown in the exploded view of FIG. 19. The device has top and bottom conductive layers 1901 and 1902 to which electrical connections are made. Between layers 1901 and 1902 are central conductive layer 407 and non-conductive layers 408 and 409 which are of a similar construction to the corresponding layers of device 801. The device 1801 also has a top insulating layer 1805 on top of its top conducting layer 1901. The layers of device 1801 are arranged such that the keyboard outline 411 and button outlines 1802 and 1903 are all within an area defined by conducting attachment portions on layers 1901 and 1902.

FIG. 20

Conducting layers 1901 and 1902 of FIG. 19 are shown separately in FIG. 20. The layers 1901 and 1902 have a construction similar to the conductive layers 401 and 402 of device 801, except that each of layers 1901 and 1902 has only two electrical connections to the conductive fabric. Furthermore, the layers 1901 and 1902 are preferably conductive in all directions i.e. unlike layers 401 and 402, layers 1901 and 1902 do not have unidirectional conductivity. Attachment portions 2001 and 2002 are located at the opposing longest sides of the layer 1901, while attachment portions 2003 and 2004 are located on the opposing shortest sides of layer 1902. Correspondingly, four conductive tracks 2005 to 2008 are provided to facilitate connection to the attachment portions. As shown in FIG. 14 the conductive tracks are configured such that one end of each of said tracks is close to the top right hand corner of its respective layer, thus easing the process of connection to cable 1804.

The interface circuit 1803 provides an output indicative of the position and the pressure applied to the alpha-numeric keyboard by a mechanical interaction. In this embodiment only one region is defined by attachment portions 2001 to 2004 and there is no requirement for multiplexing by the interface circuit 1803. Therefore, the interface circuit 1803 is of a similar type to pressure/location detection circuit 902 described with reference to FIG. 10. In effect the interface circuit operates in mode four whereby the position and pressure of a mechanical interaction is determined anywhere on the keyboard surface. When connected to a computer or similar device the output provided by circuit 1803 is interpreted by software (or hardware) resident in the computer as a particular key press, button press, position or movement on the touch pad etc.

The alpha-numeric keyboard 1801 shown in FIG. 18 does not include key registration devices, however in an alternative embodiment key registration devices of one the types described with reference to FIGS. 5, 5A, 5B or 5C and 5D are included. In particular, where it is required to give the user of the keyboard the tactile feedback of positive key location and positive key depression while ensuring the repeated accurate location for fabric compression, key registration devices of the type shown in FIG. 5C and 5D are preferred.

FIG. 21

A further alternative embodiment of the present invention is shown in FIG. 21. The alpha-numeric keyboard 2101 is connected to an interface circuit 2102 by a cable 2103. The interface circuit 2102 also includes an output socket (not shown) for connection to a computer or similar device. The alpha-numeric keyboard and the interface circuit have a similar appearance to device 1801 and interface circuit 1803 of FIG. 18, but have a different structure to them.

FIGS. 22A and 22B

The alpha-numeric keyboard 2101 has the same layered structure as device 1801 except the conductive layers 1901 and 1902 are replaced by conductive layers 2201 and 2202 as shown in FIGS. 22A and 22B. The construction of the conductive layers 2201 and 2202 is similar to that of conductive layers 401 and 402 of alpha-numeric keyboard 801, except the attachment portions of layer 2201 and 2202 have a different configuration. Layer 2201 has three short attachment portions 2203 to 2205 and a long attachment portion 2206 along one of the longest edges of the conductive fabric, and similar attachment portions 2207 to 2210 along the opposing edge. Conductive layers 2201 and 2202 are constructed to have unidirectional conductivity. Attachment portions 2203 to 2210 thus define three narrow conductive columns 2211 to 2213, and wide conductive column 2214. Layer 2202 has three narrow attachment portions 2215 to 2217 and a longer attachment portion 2218 along one of its shortest edges and similar attachment portions 2219 to 2222 along the opposing edge. The attachment portions 2215 to 2222 thus define three narrow conductive rows 2223 to 2225 and a wider conductive row 2226. By this arrangement nine small regions are defined by the intersection of the narrow rows 2223 to 2225 and the three narrow columns 2211 to 2213. The nine small regions are arranged to coincide with the individual keys in the left corner of the QWERTY keyboard that is nearest to the user. Therefore the keys for "control", "shift", "caps lock" and "alt" each correspond to one of the nine small regions. In addition seven larger regions are defined by the intersections of columns 2211 to 2214 and row 2226, and by the intersections of column 2214 and rows 2223 to 2225.

In operation, the alpha-numeric keyboard 2101 may be used as a keyboard or as a touch pad in a similar manner to device 1801. When operated as a touch pad the attachment portions on each of the four edges are connected together and connected to one of four connections on the pressure/location detection circuit 902 within circuit 2102. The circuit then operates in mode three or four to determine the position and pressure of a mechanical interaction as described in FIG. 16. The device then operates in a similar manner to the alpha-numeric keyboard 1801.

However, when used as a keyboard the position of one or more key presses is determined both by a multiplexing process and by position location within the regions defined above. Therefore, the interface circuit 2102 has a similar structure to interface circuit 803 but operates in a different manner.

When used as a keyboard the interface circuit is connected to a computer or similar device by means of its socket. In operation, the interface circuit 2102 initially connects together all the attachment portions 2203 to 2206 on one edge of layer 2201, and also connects together all the attachment portions 2215 to 2218 on the left edge of layer 2202 and looks for a closed circuit between the two sets of attachment portions. When a closed circuit is detected, the interface circuit 2102 disconnects the attachment portions 2206 and 2218, and looks for a closed circuit between the three attachment portions 2203 to 2205 and the three attachment portions 2207 to 2209.

If a closed circuit is detected this indicates that one or more of the nine keys in the bottom left hand corner of the keyboard has been pressed. In which case, the interface circuit 2102 performs a binary search in a similar manner to that performed by interface circuit 803 and hence determines which of the nine keys have been pressed. The circuit then provides an output to the computer indicative of the key or keys pressed.

If the interface circuit does not detect a closed circuit relating to the nine small regions, the interface circuit makes a connection from location/pressure detection circuit 902 to all attachment portions on one edge of layer 2201, a second connection to all attachment portions on the opposing edge of layer 2201, a third connection to all attachment portions on one side of layer 2202 and a fourth connection to all portions on the opposing edge of layer 2202. The pressure/location detection circuit 902 then provides an output indicative of the location of the key press. This output is then interpreted by software in the computer as a particular key press or presses, in a similar manner to that described with reference to device 1801.

Therefore, alpha-numeric keyboard 2101 requires less scanning than device 801, having only four conductive rows and four conductive columns but provides separate rows and columns for the keys such as "control" and "shift" which are used in double key presses.

FIG. 23

A further preferred embodiment of the present invention is illustrated in FIG. 23. In this embodiment, a fabric alpha-numeric keyboard 2301 has a plurality of key registration devices 2302 protruding from its upper surface. Each of the key registration devices 2302 corresponds to a specific letter, numeral or function key as found on any standard keyboard.

Fabric keyboard 2301 has a flexible cable 2303 which extends from the top edge 2311 of the keyboard 2301 to the hand-held processor receiving assembly 2304. The handheld processor receiving assembly 2304 further comprises interface circuitry 2305 incorporated therein and foldable legs 2306 (which are shown in FIG. 23 in their closed position) and may be extended downwards to support the hand-held processor 2307 in an elevated position relative to the surface on which it is placed.

The hand-held processor 2307 is shown in FIG. 23 in the detached position. The processor comprises a screen 2309 and buttons 2310 via which an operator may interact with the hand-held processor to select, view and input data into the device. During use of the fabric keyboard 2301 the handheld processor 2307 is located on the hand-held processor receiving assembly 2304 which is configured to engage the lower edge of the handheld processor 2307 to secure the processor in position. In this position, a connection is formed between the interface circuit and the serial input connections of the hand-held processor so as to facilitate data entry into the hand-held processor.

An example of a suitable hand-held processor device which could be used with the fabric keyboard 2301 of the present invention is a Palm$^{RTM}$ Vx processor with an eight megabyte random access memory capacity manufactured by Palm Incorporated. It must be noted that when the handheld processor 2307 is engaged with the hand-held processor receiver assembly 2304 a connection between the output of the interface device 2305 and the hand-held processor 2307 is activated such that operations of the alpha numeric keyboard are directly communicated to the hand-held processor 2307.

FIG. 24

An exploded perspective view of the fabric keyboard 2301 illustrating the constituent layers that form the keyboard is shown in FIG. 24. In the present embodiment of the invention, the fabric keyboard 2301 comprises ten individual constituent layers.

In common with all previously described embodiments, the fabric keyboard 2301 comprises a first electrically conductive fabric layer 2401 and a second electrically conductive fabric layer 2402. Both of the electrically conductive fabric layers 2401 and 2402 have electrically conductive fibres woven or knitted together such that each conductive layer is capable of conducting an electrical current in any direction along the plane of the layer rather than in a unidirectional manner as described in reference to FIGS. 1 to 4.

The first electrically conductive layer 2401 has conductive tracks 2411 and 2412 forming an electrical contact along the left and the right edges of the fabric keyboard respectively. Accordingly, a voltage gradient may be applied across the first electrically conductive layer 2401 between the right and left edges of the detector (i.e. in an X-axis direction). The second electrically conductive layer 2402 has conductive tracks 2413 and 2414 providing electrical contact along the top and bottom edges of the fabric layer respectively. Accordingly a voltage may be applied across the second electrically conductive fabric layer 2402 in a direction perpendicular to that which a voltage is applied across the first electrically conductive layer 2401 (i.e. in the Y-axis direction).

The uppermost layer of the fabric keyboard is a continuous fabric layer 2403 which has printed on its upper surface graphical representations corresponding to the alpha numeric keys of the keyboard. The graphical representations are preferably screen printed onto the fabric layer and, during the preferred construction process, the printing of the alpha-numerical graphical representations is performed once the fabric keyboard has been assembled. Furthermore, the fabric layer 2403 is preferably made from a stretchable or heat formable fabric so as to enable the fabric to be manipulated to receive the protrusions of the over centre moulding layer 2404.

The over centre moulding layer 2404 is, in this embodiment, a continuous silicone rubber sheet having key registration device mouldings protruding on its upper surface. The key registration device mouldings protruding from the upper surface of layer 2404 are specifically moulded so as to align with the alpha numerical graphical representations shown on the uppermost layer 2403. This layer will be described further in relation to FIG. 26.

In the present embodiment, there are five layers located in between the first electrically conductive layer 2401 and the second electrically conductive layer 2402. A first masking layer 2405 and a second masking layer 2406 contact the inner most surfaces of the electrically conductive layers 2401 and 2402 respectively. Both masking layers 2405 and 2406 are composed of a flexible tear resistant fabric with a laminate coating of polyurethane applied to a surface of the fabric. In an alternative embodiment, masking layers 2405 and 2406 are sheets of flexible polyurethane alone without any fabric constituent.

A series of circular holes 2415 have been punched through the masking layers 2405 and 2406. Each of these holes is located so as to align with a corresponding key registration device moulding 2416 of layer 2404. The function of the masking layers is described in more detail in reference to FIG. 26.

Located in between the masking layers 2405 and 2406 are insulating mesh layers 408 and 409 which have previously been described in reference to FIG. 4. Located between the insulating mesh layers 408 and 409 is a central conductive layer 407 which is configured to conduct an electric current from the first electrically conductive fabric layer 2401 to the second electrically conductive layer 2402 (i.e. in the Z axis direction) whilst substantially preventing any lateral current flow along the plane of the sheet (i.e. in the X and Y axis directions). The central conductive layer 407 has previously been described in more detail in reference to FIG. 4.

A final fabric layer 2407 forms the under surface of the fabric keyboard. This layer is preferably a durable fabric cover configured to provide protection to the inner encapsulated layers of the fabric keyboard. In the preferred embodiment, the under surface of layer 2407 is laminated with patches of rubber to provide a high co-efficient of friction between the keyboard and any surface onto which the keyboard is placed.

The ten layers forming the fabric keyboard are mechanically secured into position by providing an adhesive around the perimeter edges of the constituent fabric layers.

FIGS. 25A and 25B

The first electrically conductive fabric layer 2401 is shown in more detail in FIG. 25A. Two conductive tracks 2411 and 2412 form the electrical contacts with the conductive fibres of fabric layer 2401. Conductive track 2411 contacts the left edge of fabric layer 2401 via attachment portion 2511. The conduction portion 2521 of conductive track 2411 is channelled into the flexible cable 2303 and prevented from contacting the electrically conductive fabric layer 2401 by insulation strip 2501 that runs along the upper edge of fabric layer 2401.

Similarly, the conductive track 2412 contacts the electrically conductive fabric along the right edge of fabric layer 2401 via attachment portion 2512. The conduction portion 2522 extends into flexible cable 2303 and is prevented from contacting the electrically conductive fabric layer 2401 by insulation strip 2501 that runs along the upper edge of fabric layer 2401. This enables voltages to be applied between the conductive tracks 2411 and 2412 to provide a voltage gradient in the X axis direction.

The second electrically conductive layer 2402 is shown in more detail in FIG. 25B. Electrical connection is formed with the fabric layer 2402 by two conductive tracks 2413 and 2414. Conductive track 2413 forms an electrical contact with the top edge of the electrically conductive fabric 2401 via attachment portion 2513. Conduction portion 2523 extends over insulation strip 2502, that extends along the top edge of the fabric layer, and enters the flexible cable 2303. Conductive track 2414 forms an electrical connection with bottom edge of the fabric sheet 2402 via attachment portion 2514. Conduction portion 2524 extends along the right edge of the fabric sheet and a portion of the top edge of the fabric sheet and enters into the flexible fabric cable 2303. The conduction portion 2524 of conductive track 2414 is electrically insulated from the fabric layer by insulating strips 2502 which extends along the top edge and 2503 which extends along the right edge.

Accordingly, voltages may be applied between the conductive tracks 2413 and 2414 so as to provide a voltage gradient across the electrically conductive fabric layer 2402 from top to bottom in the Y axis direction.

In this embodiment, only four connections are possible to the fabric keyboard, a single connection is formed to each of conductive tracks 2411 and 2412 of fabric layer 2401, and a single connection is formed to each of conductive tracks 2413 and 2414 of layer 2402. Accordingly, there is no specific requirement for the multiplexing interface circuitry detailed in reference to FIG. 6. Alternatively, such circuitry may be present but remain permanently connected to the four possible electrical connections. In the preferred embodiment, the pressure/location detection circuit 902 is directly connected to the conductive tracks 2411, 2412, 2413 and 2414. For example, connection 1003 and 1004, as shown in FIG. 10 connect to conductive tracks 2411 and 2412 of layer 2401 respectively, and connection 1005 and 1006 connect to conductive tracks 2413 and 2414 of layer 2402. In this configuration, the pressure of a mechanical interaction and the X and Y positional co-ordinates of a mechanical interaction are determined as described in reference to FIGS. 11 to 17.

FIGS. 26A and 26B

A portion of the fabric keyboard 2301 showing cross-section through a single key area of the fabric keyboard is shown in FIG. 26A and FIG. 26B. FIG. 26A shows an illustration of a key in the absence of a mechanical interaction. The key registration device 2601 is moulded into the silicone rubber of the over centre moulding layer 2404. Located underneath the over centre moulded layer 2404 is, in order of occurrence, the first electrically conductive fabric layer 2401, the first mask layer 2405, the first insulating mesh layer 408, the central conductive layer 407, the second insulating mesh layer 409, the second mask layer 2406, the second electrically conductive fabric layer 2402 and the lower fabric layer 2407. In contact with the upper surface of the over centre moulding layer 2404 is the upper fabric layer 2403. A graphical representation of the letter, numeral or function to which the key registration device 2601 corresponds is printed onto the upper surface of fabric layer 2403 to directly coincide with the centre of the key registration device protrusion 2601. The lower surface of the key registration device protrusion 2601 has a contact protrusion 2602 extending towards the electrically conductive layer 2401.

An operators' finger 503 is shown in FIG. 26A forming an initial contact with the upper surface of the key registration device protrusion 2601. Pressure is applied by the finger 503 to the key registration device protrusion 2601 causing the key registration device to flex in a downward direction towards the first electrically conductive layer 2401 as shown in FIG. 26B. The contact protrusion 2602 mechanically compresses the first electrically conductive layer 2401 into close contact with the first mesh layer 408 the central conductive layer 407, the second mesh layer 409 and the second electrically conductive fabric layer 2402. It can be seen from FIG. 26B that the key registration device 2601 and the associated contact protrusion 2602 are specifically aligned so as to facilitate a mechanical interaction bringing the electrically conductive layers closer together (as indicated at 2605) through a hole in the first and second masking layers 2405 and 2406. It should also be noted that the depression of the key registration device by the operators finger and the resultant bend portions 2603 and 2604 provide tactile feedback to the users finger indicating the appropriate key on the fabric keyboard has been pressed.

The result of the mechanical interaction forcing the first electrically conductive layer 2401 and the second electrically conductive layer 2402 into close contact is that a voltage applied to either layer will result in a current flowing from one layer to another and enable electrical measurements to be made and the positional co-ordinates of the mechanical interaction to be determined as previously described. The positional co-ordinate data is supplied to the hand-held processor via the interface circuit. The hand-held processor subsequently correlates the X and Y positional co-ordinate data obtained at the point of the mechanical interaction with a series of look-up tables so that the corresponding data input function corresponding to the key pressed can be determined.

In this regard, the insulating masking layers 2405 and 2406 limit the areas within which a mechanical interaction may result in a current flowing between the first and the second electrically conductive layers 2401 and 2402. Accordingly, an output will only be sent to the hand-held processor when a key is pressed and not following an accidental mechanical interaction at a point on the keyboard other than a key registration device. Therefore, the masking layers 2405 and 2406 prevent the transmission of ambiguous X and Y positional co-ordinate data correlating to positions around the pre-selected key registration devices and resulting in the correlation with a data input from the look-up table in response to an accidental mechanical interaction within the region around a key registration device.

The masking layers 2405 and 2406 are preferably thin layers (thickness of less than one millimeter) comprising holes having a diameter comparable to the diameter of the upper surface of the protrusion portion of the key registration device. This feature is particularly advantageous to allow for suitable tolerances for misalignments that may occur during assembly of the fabric keyboard. In an alternative embodiment, the masking layer 2405 and 2406 may be thicker to provide a greater separation between the first electrically conductive fabric layer 2401 and a central conductive fabric layer 407 and prevent accidental contact during flexing of the keyboard. In such embodiments the insulating mesh layer 408 and 409 may be omitted.

In an alternative embodiment, the masking layers 2405 and may be omitted and the look-up tables of the hand-held processor device may be programmed to reduce the limits of acceptable variation with which the X and Y positional data of a mechanical interaction received is correlated with a specific out data input. For example an operator wishing to press the key corresponding to the letter "Q" will be required to provide a mechanical interaction having an X co-ordinate of fifteen (which corresponds to the centre of the "q" key registration device) with a lower acceptable variation of, for example, plus or minus three rather than plus or minus six. In addition, the look-up tables will require that the mechanical interaction corresponding for a "q" key press has a Y value of 200 (corresponding to the centre of the "Q" key registration device) with an acceptable variation limit of, for example, plus or minus ten rather than plus or minus twenty. In this embodiment it will be apparent that any mechanical interaction around the "Q" key which is outside the acceptable limits of the look-up table corresponding to the "Q" key will not result in an input indicative of the pressing of the "Q" key.

FIG. 27

FIG. 27 illustrates an operator of the fabric keyboard 2301 located within a confined space of a briefcase 2702 supported on a table 2703. Such a situation commonly occurs when an operator, such as a businessman, wishes to type material into a processor whilst in an out of office location. The fabric keyboard 2301 is conveniently located around other items of the briefcase 2702 and is connected to the hand held processor 2307 by the flexible cable 2303 and hand-held processor receiving assembly 2304. Accordingly, the operator, by pressing keys of the keyboard 2301 can input data into the hand-held processor and the positional co-ordinates at which the key is pressed is correlated with a specific data entry which is displayed on the screen 2309 of the hand-held processor.

What is claim is:

1. A foldable alpha numeric keyboard device configured to input data items into a computer or similar processing device, said keyboard device comprising a first electrically conductive fabric layer and a second electrically conductive fabric layer; an interface circuit configured to supply voltages to and receive outputs from said keyboard; wherein aid keyboard is configured to produce an output in response to a mechanical interaction and said interface circuit is arranged to respond to said mechanical interaction nd to provide a data item to said computer or similar processing device.

2. a foldable alpha-numeric keyboard device according to claim 1, wherein said keyboard further comprises at least one electrically insulative masking layer disposed between said first electrically conductive fabric layer and said second electrically conductive fabric layer, said masking layer defining a plurality of holes through which electrical contact between said first electrically conductive fabric layer and said second electrically conductive fabric layer can occur.

3. A foldable alpha-numeric keyboard device according to claim 1, wherein said device provides an output indicative of the pressure applied by said mechanical interaction.

4. A foldable alpha-numeric keyboard device according to claim 3, wherein, in response to a mechanical interaction, a single measurement is made representing said resistance between the first and second electrically conductive layers of the keyboard and an output indicative of a mechanical interaction is provided.

5. A foldable alpha-numeric keyboard device according to claim 3, wherein, in response to a mechanical interaction, two measurements are made representing said resistance between the first and second electrically conductive layers of the keyboard and an output indicative of a mechanical interaction is provided.

6. A foldable alpha-numeric keyboard device according to claim 1, wherein a plurality of key outlines are defined on said keyboard device, and said keyboard device includes a number of key registration devices configured to assist compression of said first layer and said second layers within a particular one of said key outlines.

7. A foldable alpha-numeric keyboard device according to claim 6, wherein said key registration device provides an indication of the location of a key.

8. A foldable alpha-numeric keyboard device according to claim 6, wherein a plurality of said key registration devices are configured to deform under pressure and provides an indication that a key has been pressed.

9. A foldable alpha-numeric keyboard device according to claim 8, wherein each of said key registration devices as a dome-like configuration and when under pressure, each said key registration device deforms inwardly from a first position until at a second position resistance to deformation is suddenly reduced, while on release of said pressure said key registration device returns to its dome-life configuration.

10. A foldable alpha-numeric keyboard device according to claim 8, wherein a key registration device is located above said first fabric layer and said second fabric layer and said key registration device includes a base having a surface for attachment to one of said fabric layers and a pressure focusing means, wherein said pressure focusing means is configured to apply a force to an area of said fabric layers when said key registration device is under pressure, and said pressure focusing means is configured such hat said area is smaller than said base attachment surface.

11. A foldable alpha numeric keyboard device according to claim 1, wherein said first electrically conductive fabric layer is displaced from said second electrically conductive fabric layer, such that conduction between said first layer and said second layer results when said first layer and said second layer are forced together by a mechanical interaction.

12. A foldable alpha-numeric keyboard device according to claim 11, wherein said keyboard further comprises a central conductive layer disposed between the first and second conductive layers, said central conductive layer having a conductance that increases as it is planed under press re and allowing conduction between said first layer and said second layer in response o a mechanical interaction.

13. A foldable alpha-numeric keyboard device according to claim 12, wherein said keyboard further comprises a first insulating means disposed between said first conductive layer and said central conductive layer, and a second insulating means disposed between said second conductive layer and said central conductive layer.

14. A foldable alpha-numeric keyboard device according to claim 11, wherein said first fabric layer includes conductive yarns electrically grouped to define a plurality of conductive rows, said second fabric layer includes conductive yarns electrically grouped to define a plurality of conductive columns and the intersections of said rows and columns define separate regions of said keyboard device.

15. A foldable alpha-numeric keyboard device according to claim 11, wherein said interface circuit has two electrical connections only to each of said first conductive layer and said second conductive layers.

16. A foldable alpha-numeric keyboard device according to claim 15, wherein said first conductive layer and said second conductive layer are conductive in all directions.

17. A foldable alpha-numeric keyboard device according to claim 15, wherein said electrical connections are made to opposing edges of said first conductive layer and to opposing edges of paid second conductive layer.

18. A foldable alpha-numeric keyboard device according to claim 15, wherein said interface circuit includes a voltage supply means configured to apply a voltage across said first conductive layer;

a voltage measurement means configured to measure a first voltage;

a voltage supply means configured to apply a voltage across said second conductive layer;

a voltage measurement means configured to measure a second voltage; and output means configured to provide an output dependent on said first and second voltages, indicative of the position of said mechanical interaction.

19. A foldable alpha-numeric keyboard device according to claim 14, wherein said interface circuit is configured to provide an output indicative of the specific region at which a mechanical interaction is present.

20. A foldable alpha-numeric keyboard device according to claim 14, wherein said interface circuit is configured to apply a voltage across a larger region defined by a plurality of said separate regions and to provide an output indicative of the position of the mechanical interaction within said larger region.

21. A foldable alpha-numeric keyboard device according to claim 14, wherein said first fabric layer includes conductive fibres extending in a first direction and non-conductive fibre extending in a second direction, said second fabric layer includes conductive fibres extending in a third direction and non-conductive fibres extending in a fourth direction, such that said third direction is different to said first direction.

22. A method of identifying key presses on the foldable keyboard device of claim 14, said method including the steps of applying a voltage to a larger region defined by a plurality of said separate regions;

detecting the presence of a mechanical interaction; and determining the specific region at which said mechanical interaction is present.

23. A foldable alpha-numeric keyboard device according to claim 14, wherein said interface circuit is configured to apply a voltage across a particular one of said regions and to provide in output indicative of the position of the mechanical interaction within said particular region.

24. A foldable alpha-numeric keyboard device according to claim 23, wherein at least one of said separate regions each corresponds to a plurality of different keys and a plurality of said separate regions each correspond to one key only.

25. A foldable keyboard device configured to input data items into a computer or similar processing device, said keyboard device comprising a first electrically conductive fabric layer and a second electrically conductive fabric layer; an interface circuit configured to supply voltages to and receive outputs from said keyboard; wherein said keyboard is configured to produce an output in response to a mechanical interaction and said interface circuit is arranged to respond to said mechanical interaction and to provide a data item to said computer or similar processing device, wherein a plurality of key outlines are defined on said keyboard device, and said keyboard device includes a key registration device configured to focus compression of said first layer and said second layer during a mechanical interaction on a location within a key outline.

* * * * *

UNITED STATES PATENT AND TRADEMARK OFFICE
CERTIFICATE OF CORRECTION

PATENT NO. : 6,861,961 B2
DATED : March 1, 2005
INVENTOR(S) : David Lee Sanbach et al.

It is certified that error appears in the above-identified patent and that said Letters Patent is hereby corrected as shown below:

Column 9,
Line 62, "dosed" should be -- closed --.

Column 19,
Line 31, "comer" should be -- corner --.

Column 24,
Line 37, "claim" should be -- claimed --
Line 43, "aid" should be -- said --
Line 46, "nd" should be -- and --
Line 49, "a" should be -- A --

Column 25,
Line 31, "hat" should be -- that --
Line 42, "planed" should be -- placed --
Line 43, "press re" should be -- pressure --

Signed and Sealed this

Fourteenth Day of June, 2005

JON W. DUDAS
*Director of the United States Patent and Trademark Office*